US009262809B2

(12) United States Patent  
Gagnon et al.

(10) Patent No.: US 9,262,809 B2  
(45) Date of Patent: Feb. 16, 2016

(54) METHOD AND APPARATUS FOR IMAGE NOISE FILTERING

(71) Applicant: CENTRE DE RECHERCHE INDUSTRIELLE DU QUEBEC, Quebec (CA)

(72) Inventors: Richard Gagnon, Quebec (CA); Jean-Pierre Couturier, Quebec (CA)

(73) Assignee: CENTRE DE RECHERCHE INDUSTRIELLE DU QUEBEC, Quebec (CA)

( * ) Notice: Subject to any disclaimer, the term of this patent is extended or adjusted under 35 U.S.C. 154(b) by 0 days.

(21) Appl. No.: 14/245,136

(22) Filed: Apr. 4, 2014

(65) Prior Publication Data

US 2014/0307119 A1  Oct. 16, 2014

Related U.S. Application Data

(60) Provisional application No. 61/811,422, filed on Apr. 12, 2013.

(51) Int. Cl.  
*G06T 5/00* (2006.01)

(52) U.S. Cl.  
CPC ....... *G06T 5/002* (2013.01); *G06T 2207/10152* (2013.01); *G06T 2207/30161* (2013.01); *G06T 2207/30164* (2013.01)

(58) Field of Classification Search  
CPC ............... G06T 5/002; G06T 2207/30164; G06T 2207/10152; G06T 2207/30161  
See application file for complete search history.

(56) References Cited

U.S. PATENT DOCUMENTS

| 5,000,569 | A | 3/1991 | Nylund |
| 5,177,556 | A | 1/1993 | Rioux |

(Continued)

FOREIGN PATENT DOCUMENTS

| CA | 2043336 C | 7/1999 |
| CA | 2297879 A1 | 8/2001 |

OTHER PUBLICATIONS

Blais et al. "New Development in 3D Laser Scanners: From Static to Dynamic Multi-Modal Systems" Proceeding of the 6th Conference on Optical 3-D Measurement Techniques, Zurich, Switzerland, Sep. 22, 2003.

(Continued)

*Primary Examiner* — Twyler Haskins  
*Assistant Examiner* — Padma Haliyur  
(74) *Attorney, Agent, or Firm* — Jean-Claude Boudreau

(57) ABSTRACT

Methods and apparatus for filtering noise of low frequency from an image of the surface characteristics of an object expressed with reference to orthogonal first and second axis and obtained with linear light scanning, involve calculating a difference between pixel values of an image column vector along the second axis adjacent a selected reference image column vector and respective pixel values of the selected reference image column vector to obtain a pixel difference vector. The pixel difference values not mainly associated with a corresponding atypical change of surface characteristics as compared with noise are then selected, and a mean value from the selected pixel difference values are calculated as an estimated value of the noise. The estimated noise value are subtracted from the adjacent image column vector to obtain a corrected image column vector. The calculations are repeated using the corrected image vector as the reference image column vector and a further adjacent image column vector to obtain further corrected image column vectors, from which a noise filtered image is generated.

16 Claims, 11 Drawing Sheets

(56) References Cited

U.S. PATENT DOCUMENTS

| | | |
|---|---|---|
| 5,701,173 A | 12/1997 | Rioux |
| 5,708,498 A | 1/1998 | Rioux et al. |
| 5,960,104 A | 9/1999 | Conners et al. |
| 6,122,065 A | 9/2000 | Gauthier |
| 6,297,488 B1 | 10/2001 | Beraldin et al. |
| 6,708,122 B2 | 3/2004 | Lessard et al. |
| 7,154,556 B1 * | 12/2006 | Wang et al. .......... 348/452 |
| 7,375,760 B2 * | 5/2008 | Kempf et al. .......... 348/441 |
| 7,429,999 B2 | 9/2008 | Poulin et al. |
| 7,466,403 B2 | 12/2008 | Carman et al. |
| 8,193,481 B2 | 6/2012 | Garneau et al. |
| 8,199,215 B2 | 6/2012 | Phelippeau et al. |
| 2004/0246473 A1 | 12/2004 | Hermary et al. |
| 2009/0142000 A1 * | 6/2009 | Sono .......................... 382/274 |
| 2010/0188500 A1 | 7/2010 | Bouchard et al. |
| 2012/0274758 A1 | 11/2012 | Lessard |

OTHER PUBLICATIONS

Blais et al. "High Resolution Imaging at 50μm using a Portable XYZ-RGB Color Laser Scanner" International Workshop on Recording, Modeling and Visualization of Cultural Heritage, Ascona, Switzerland, May 22, 2005.

* cited by examiner

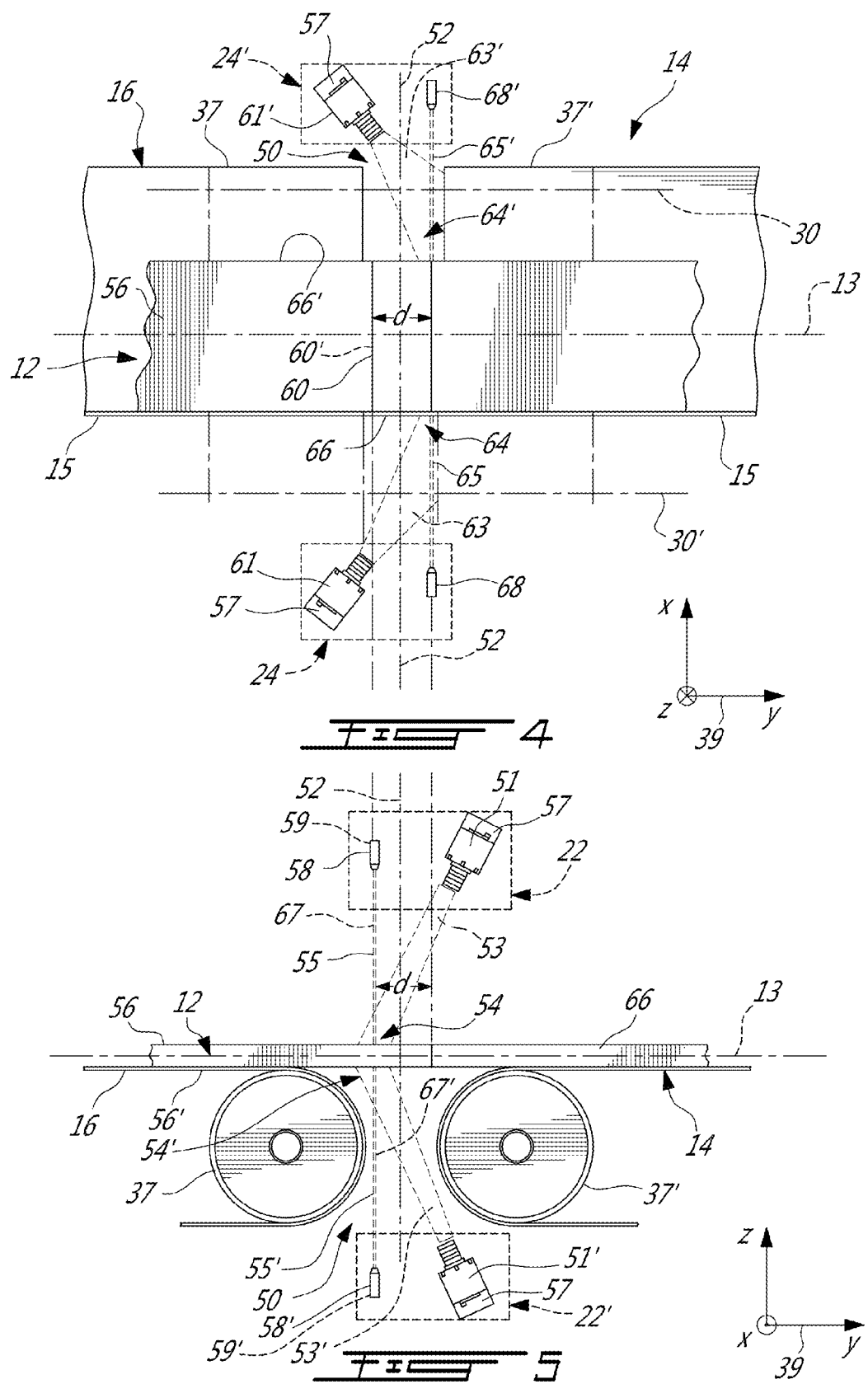

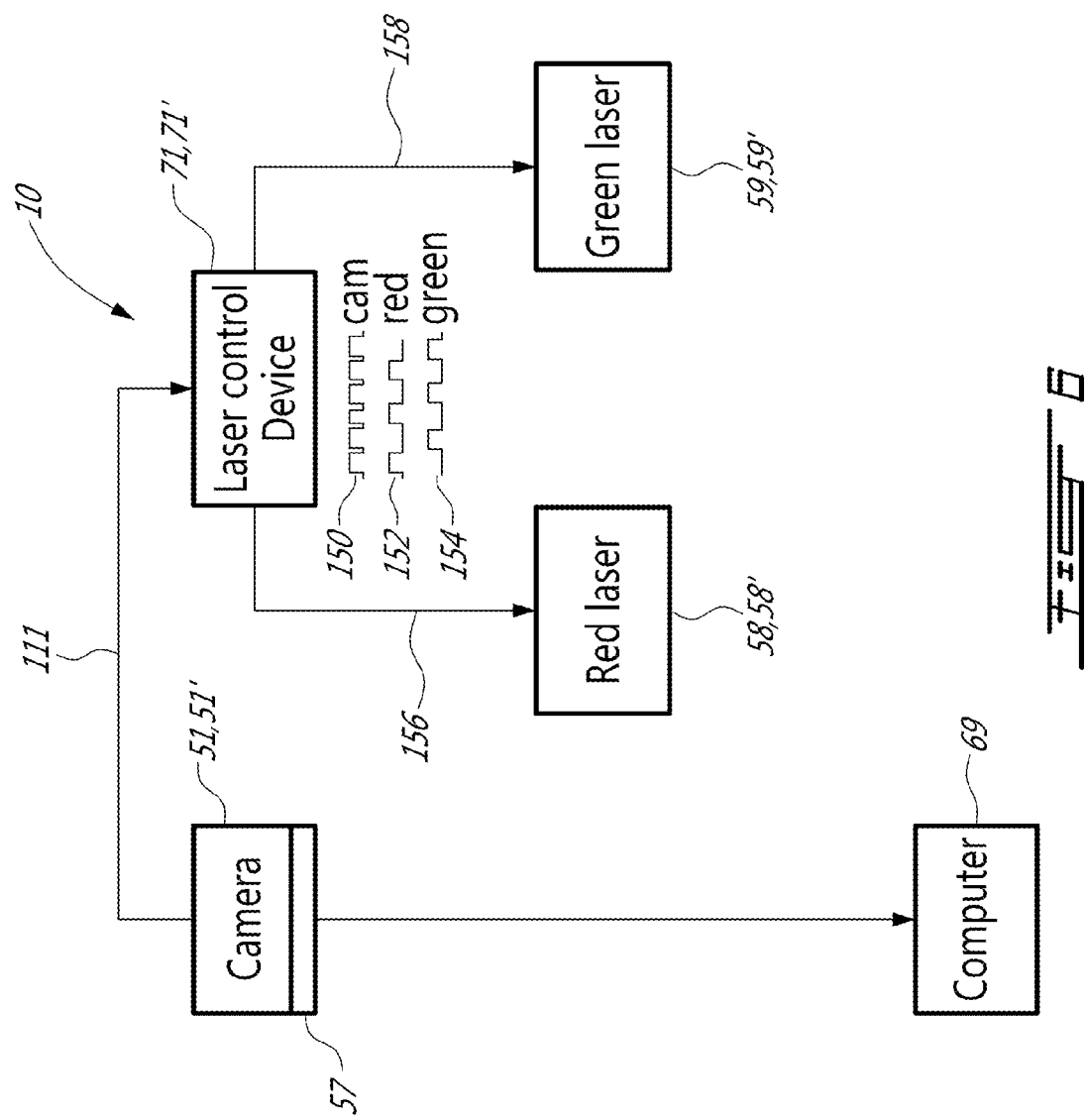

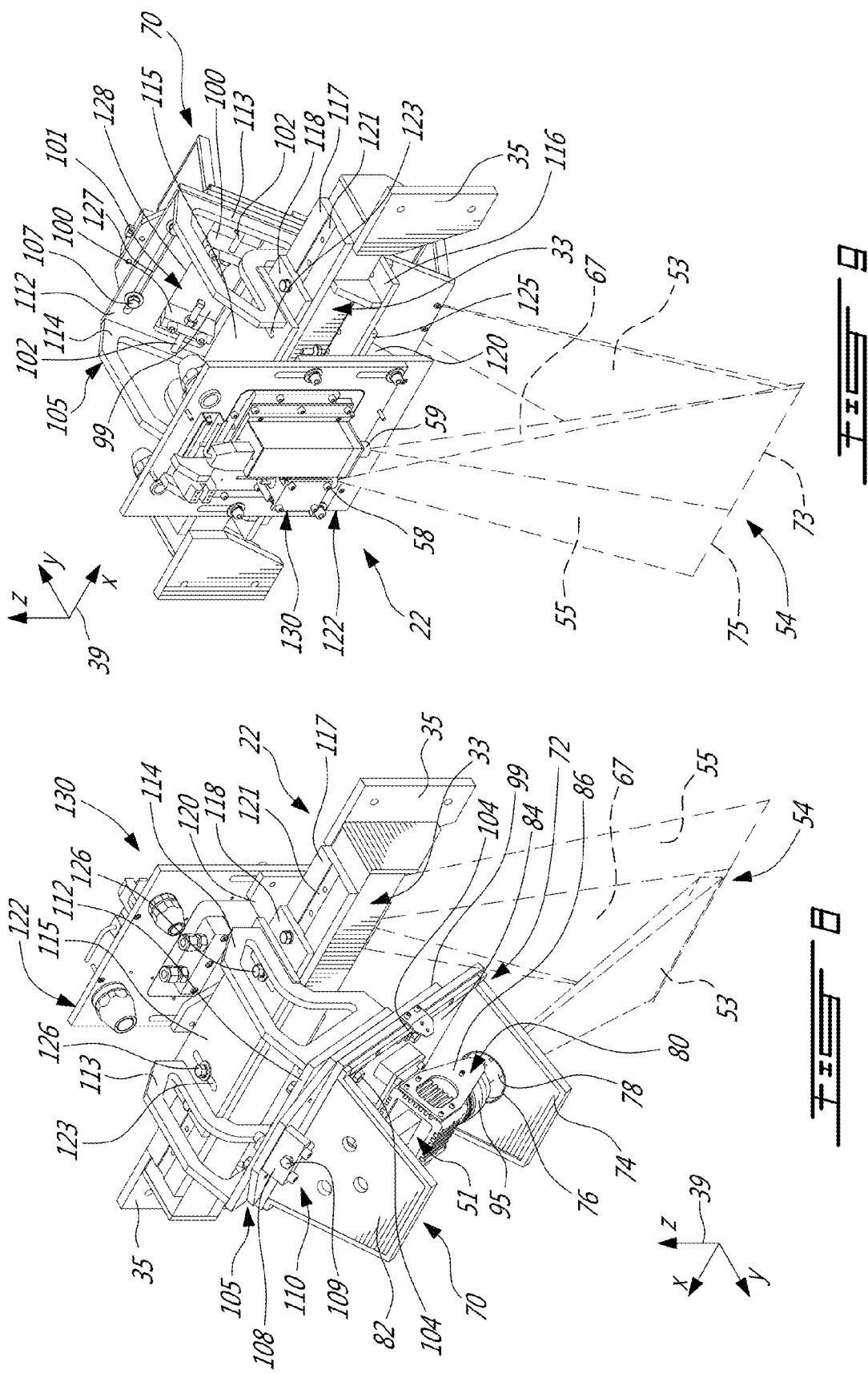

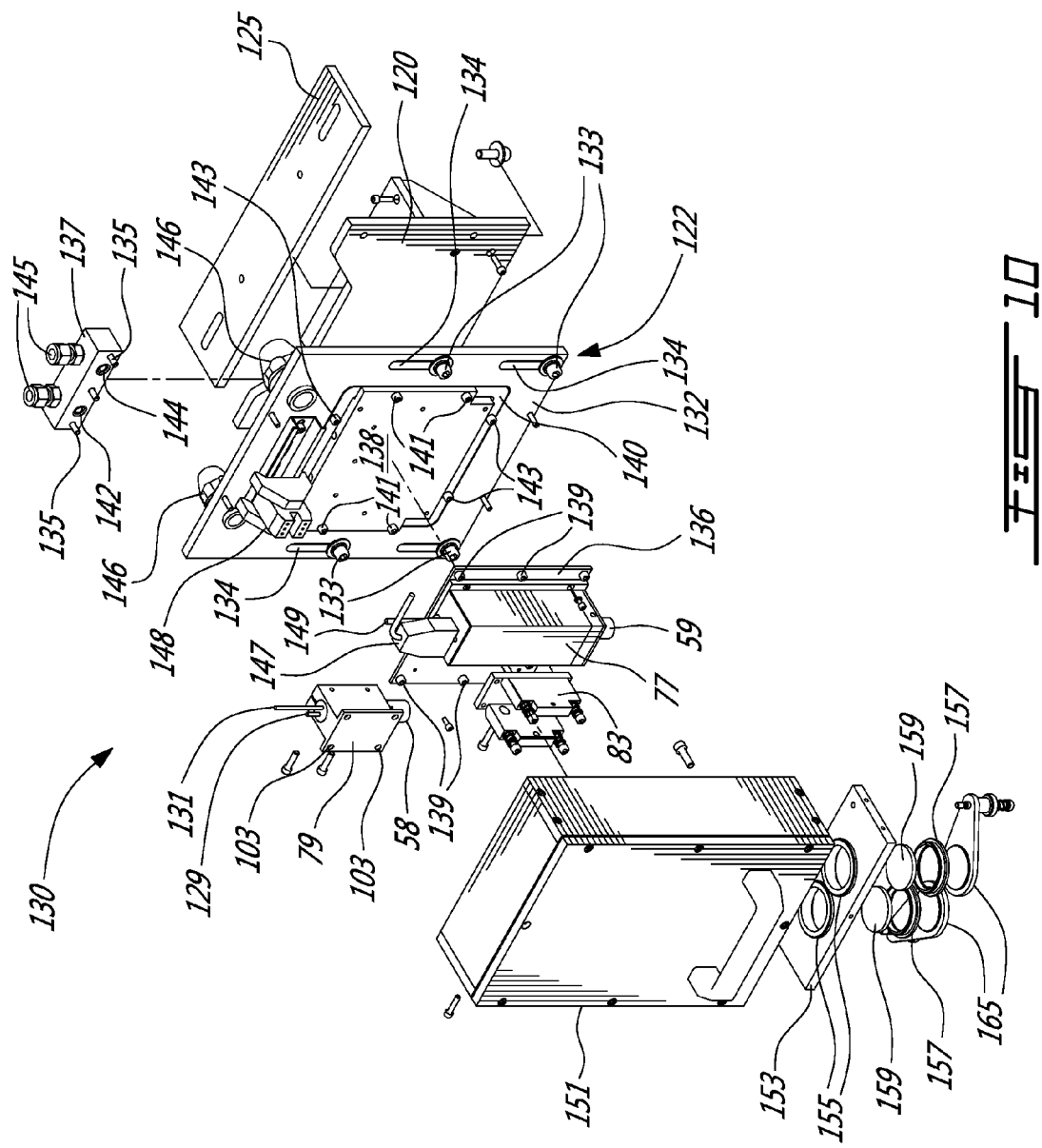

METHOD AND APPARATUS FOR IMAGE NOISE FILTERING

CROSS-REFERENCE TO RELATED APPLICATIONS

This application claims the benefit of U.S. Provisional application No. 61/811,422, filed Apr. 12, 2013.

FIELD OF THE INVENTION

The present invention relates to the field of optical inspection technologies such as used for grading, sorting or quality control purposes in product manufacturing industries, and more particularly to techniques for filtering noise that affects images representing the surface characteristics of inspected objects.

BACKGROUND OF THE INVENTION

During the past years, systems for scanning the surface of moving objects have been developed and applied for grading, sorting or quality control purposes in many high volume manufacturing applications such as found in the automotive, consumer electronics, agricultural, food or wood and lumber processing industries. Such scanning systems typically use digital cameras for detecting reflection-related characteristics of the surface of objects under inspection, which cameras can also be used as profile sensors based on laser triangulation to measure geometrical and other 3D surface characteristics of the inspected objects. In some applications, many characteristics of the object surface must be detected, thus requiring integration of several optical scanning sensors using associated lighting devices and whose outputs are combined for the desired purpose. A known defect detection system for lumber using that approach is disclosed in U.S. Pat. No. 5,960,104 to Conners et al., wherein color cameras are employed to detect surface features, and a laser profiling device is employed to perform three-dimensional (3D) shape detection. However, the integration of several sensors generally increases complexity, dimensions and cost of the scanning system.

In some prior known scanning apparatus, each scanning unit includes a digital camera associated with a single laser directing a linear-shaped laser beam onto the board surface under inspection, to form a laser line that intersects the field of view of the camera, which is capable of generating a 3D profile image of the board surface through a laser triangulation technique based on detected position of the laser line. Furthermore, to provide scanning unit compactness, it is known that from the same imaging sensors (CMOS or CCD) provided on such 3D digital camera, it is possible to simultaneously generate a 2D image of the same board surface from the measured mean intensities of the reflected laser line. Moreover, a linear laser source can also be used to provide lighting in cases where only 2D imaging is required. Typically, a 2D image can be expressed in terms of a plurality of line image vectors forming a matrix with reference to orthogonal first and second axis X and Y, such as obtained while moving the inspected object (or the camera) relative to the camera (or the object) along Y axis, while performing laser scanning using a linear laser source that extends along X axis. Such 2D image can also be represented as a plurality of column image vectors extending along Y axis forming the same matrix. In practice, the measured variation between successive values of column image vectors is mainly associated with corresponding changes in reflectance characteristics of the scanned surface. However, the measured variation may also be influenced by low frequency noise along scanning direction X caused by irregularity of illumination that may be due to imperfections of the source of linear light, especially in the case of a laser source, or to a misalignment of the linear light source with respect to the scanned surface orientation. In attempting to filter that noise using conventional known techniques, it is difficult to do so without adversely affecting the portion of image data representing actual changes in reflection characteristics of the scanned surface.

Therefore, there is a need for improving techniques for filtering low frequency noise in images obtained with linear light scanning.

SUMMARY OF THE INVENTION

This is a main object of the present invention to provide methods and apparatus for filtering noise of low frequency from images of objects obtained with linear light scanning, without adversely affecting the portion of image data representing actual changes in reflection characteristics of the scanned surface.

According to the above-mentioned main object, from a broad aspect of the present invention, there is provided a method of filtering noise of low frequency from an image of surface characteristics of an object expressed with reference to orthogonal first and second axis and obtained with linear light scanning along the first axis. The method comprises the steps of: i) calculating a difference between pixel values of an image column vector along the second axis adjacent a selected reference image column vector and respective pixel values of the selected image column vector to obtain a pixel difference vector; ii) selecting the pixel difference values not mainly associated with a corresponding atypical change of surface characteristics as compared with noise; iii) calculating a mean value from the selected pixel difference values as an estimated value of the noise; iv) subtracting the estimated noise value from the adjacent image column vector to obtain a corrected image column vector; v) repeating said steps i) to iv) using the corrected image vector as the reference image column vector and a further adjacent image column vector to obtain further corrected image column vectors; and vi) generating a noise filtered image from the obtained corrected image column vectors.

In an embodiment of the above basic image noise filtering method, the step v) further includes, at each repetition of said steps i) to iv), the steps of: a) calculating a cumulative mean value from the mean value calculated at said step iii); and b) as part of the difference calculating step i), subtracting the cumulative mean value from the pixel values of said adjacent image column vector and using subtraction resulting values to calculate the difference with the respective pixel values of the selected image column vector to obtain the pixel difference vector.

According to the above-mentioned main object, from another broad aspect of the present invention, there is provided a non-transitory software product data recording medium in which program code is stored causing a data processing means to perform the above image noise filtering method.

According to the above-mentioned main object, from another broad aspect of the present invention, there is provided a method of filtering noise of low frequency from an image representing surface characteristics of an object scanned along a travel path axis using an imaging sensor having a sensing field defining a scanning zone, said image being expressed with reference to orthogonal first and second axis and obtained with linear light scanning along said first axis. The method comprises the steps of: i) directing the sensing field transversely toward said travel path axis; ii) directing a linear-shaped light beam toward said scanning zone to form a reflected line onto said object surface; iii) causing said imaging sensor to capture said reflected line and to produce said image representing the surface characteristics of said object; iv) calculating a difference between pixel values of an image column vector along said second axis adjacent a selected reference image column vector and respective pixel values of said selected image column vector to obtain a pixel difference vector; v) selecting the pixel difference values not mainly associated with a corresponding atypical change of surface characteristics as compared with noise; vi) calculating a mean value from said selected pixel difference values as an estimated value of said noise; vii) subtracting the estimated noise value from the adjacent image column vector to obtain a corrected image column vector; viii) repeating said steps iv) to vii) using the corrected image vector as said reference image column and a further adjacent image column vector to obtain further corrected image column vectors; and ix) generating a noise filtered image from the obtained corrected image column vectors.

In an embodiment of the above image noise filtering method, the step viii) further includes, at each repetition of said steps iv) to vii), the steps of: a) calculating a cumulative mean value from said mean value calculated at said step iii); and b) as part of said difference calculating step iv), subtracting the cumulative mean value from said pixel values of said adjacent image column vector and using subtraction resulting values to calculate said difference with the respective pixel values of the selected image column vector to obtain said pixel difference vector.

According to the above-mentioned main object, from another broad aspect of the present invention, there is provided an apparatus for generating a low frequency noise filtered image representing surface characteristics of an object scanned along a travel path axis, said image being expressed with reference to orthogonal first and second axis and obtained with linear light scanning along said first axis. The apparatus comprises an imaging sensor unit having a sensing field transversely directed toward the travel path axis and defining a scanning zone, said imaging sensor unit including: a light source configured for directing a linear-shaped light beam toward the scanning zone to form a reflected line onto the article surface; and a digital camera defining the sensing field and configured to capture the reflected line and to produce the image representing the surface characteristics of said object. The apparatus further comprises data processor means programmed for: calculating the difference between pixel values of an image column vector along the second axis adjacent a selected reference image column vector and respective pixel values of the selected reference image column vector to obtain a pixel difference vector; selecting the pixel difference values not mainly associated with a corresponding atypical change of surface characteristics as compared with noise; calculating a mean value from the selected pixel difference values as an estimated value of the noise; subtracting the estimated noise value from the adjacent image column vector to obtain a corrected image column vector; repeating said pixel difference values calculating, said pixel difference values selecting, said mean value calculating and said estimated noise value subtracting, using the corrected image vector as the reference image column vector and a further adjacent image column vector to obtain further corrected image column vectors; and generating a noise filtered image from the obtained corrected image column vectors.

In an embodiment of the above apparatus, the data processor means is further programmed, at each said repeating, for: calculating a cumulative mean value from the calculated mean value; and as part of said difference values calculating, subtracting the cumulative mean value from the pixel values of said adjacent image column vector and using subtraction resulting values to calculate said difference with the respective pixel values of the selected image column vector to obtain said pixel difference vector.

BRIEF DESCRIPTION OF THE DRAWINGS

Some embodiments of the present invention will now be described in detail with reference to the accompanying drawings in which:

FIG. 4 is a schematic sectional view of the apparatus along section lines 4-4 of FIG. 2, illustrating the configuration of optical elements used for scanning the object side surfaces;

FIG. 5 is a schematic sectional view of the apparatus along section lines 5-5 of FIG. 2, illustrating the configuration of optical elements used for scanning the object top and bottom surfaces;

FIG. 6 is a schematic block diagram of a scanning apparatus showing its basic components;

FIG. 8 is a perspective front view of an imaging sensor unit provided on the apparatus of FIG. 1, showing the digital camera;

FIG. 9 is a perspective rear view of the imaging sensor unit of FIG. 8, showing the dual laser assembly without its enclosure;

FIG. 10 is an exploded view of the dual laser assembly of FIG. 8, provided with its enclosure.

DETAILED DESCRIPTION OF EMBODIMENTS

The above summary of invention has outlined rather broadly the features of the present invention. Additional features and advantages of some embodiments illustrating the subject of the claims will be described hereinafter.

Figure 1:
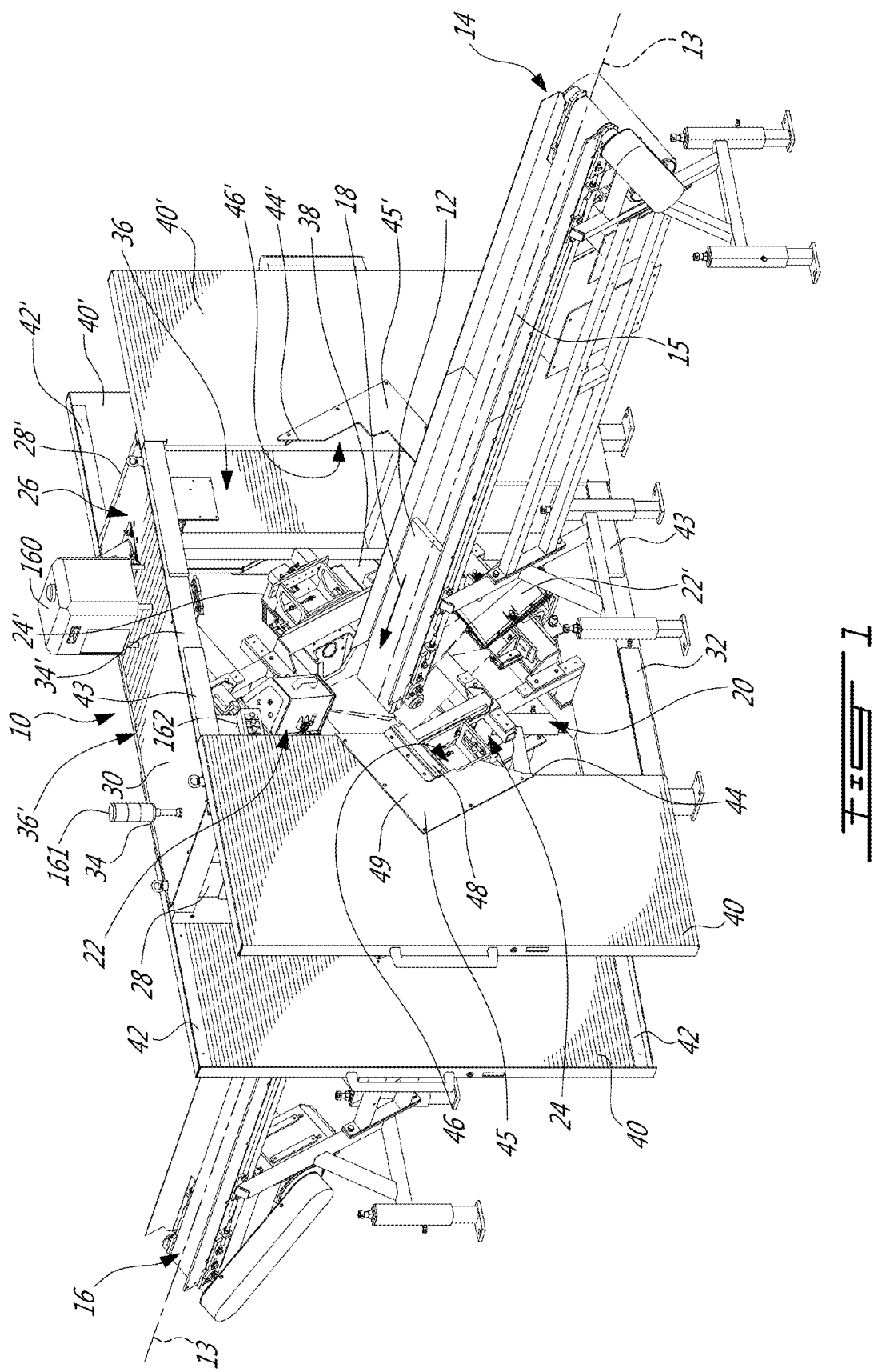
FIG. 1 is a perspective view of an example of laser scanning apparatus designed for simultaneously scanning four surfaces of an object, which has infeed and outfeed conveyer units for moving the object to be inspected through the apparatus, showing access doors provided on the apparatus enclosure in their open position.

Referring now to FIG. 1, there is shown an example of laser scanning apparatus as generally designated at 10, designed for simultaneously scanning four adjacent surfaces of an object 12, which is a wooden board to be inspected in the present example, to produce images of the surface characteristics of the object. As will be explained below in detail, the produced images can be filtered to reduce low frequency noise induced by linear laser scanning. It is to be understood that images generated through scanning with any other type of linear light source that induce low frequency noise, may be filtered by the methods that will be described below in detail. Moreover, it will be appreciated by the person skilled in the art that the laser scanning apparatus 10 that will be described below in the context of a practical application of the proposed image noise filtering methods, could be adapted to inspect objects of various nature, materials or shapes. The apparatus 10 according to the present example is capable of generating two complementary color image frames representing the surface of the object, from which reflection-related characteristics of the scanned surface can be detected, such knots, heartwood and sapwood areas, as will be explained below in detail. Each one of color image frames can be processed using the proposed methods in order to reduce low frequency noise, as will be explained below in detail. Furthermore, profile-related image data can be used to detect other board characteristics including geometrical and surface defects such as wane, holes, cracks etc., using known detection techniques such as disclosed in prior U.S. Pat. Nos. 8,502,180 and 6,122,065 naming the same applicant, the entire content of which documents being incorporated herein by reference. The detected characteristics are typically fed to a cut optimizer software providing a cutting solution into subdivided products from each board, producing an optimum yield in term of either economic value or material utilization. Any appropriate optimization approach can be used, including a one-axis or two-axis optimization approach such as described in U.S. Pat. No. 6,690,990 issued to the same applicant. For example, the apparatus 10 may be used by a furniture or floorwood manufacturing plant to increase production yields by upgrading wood products in view of raw wooden board quality and by minimizing the impact of any raw wood quality decrease upon profitability and performance of the manufacturing plant.

Figure 2:
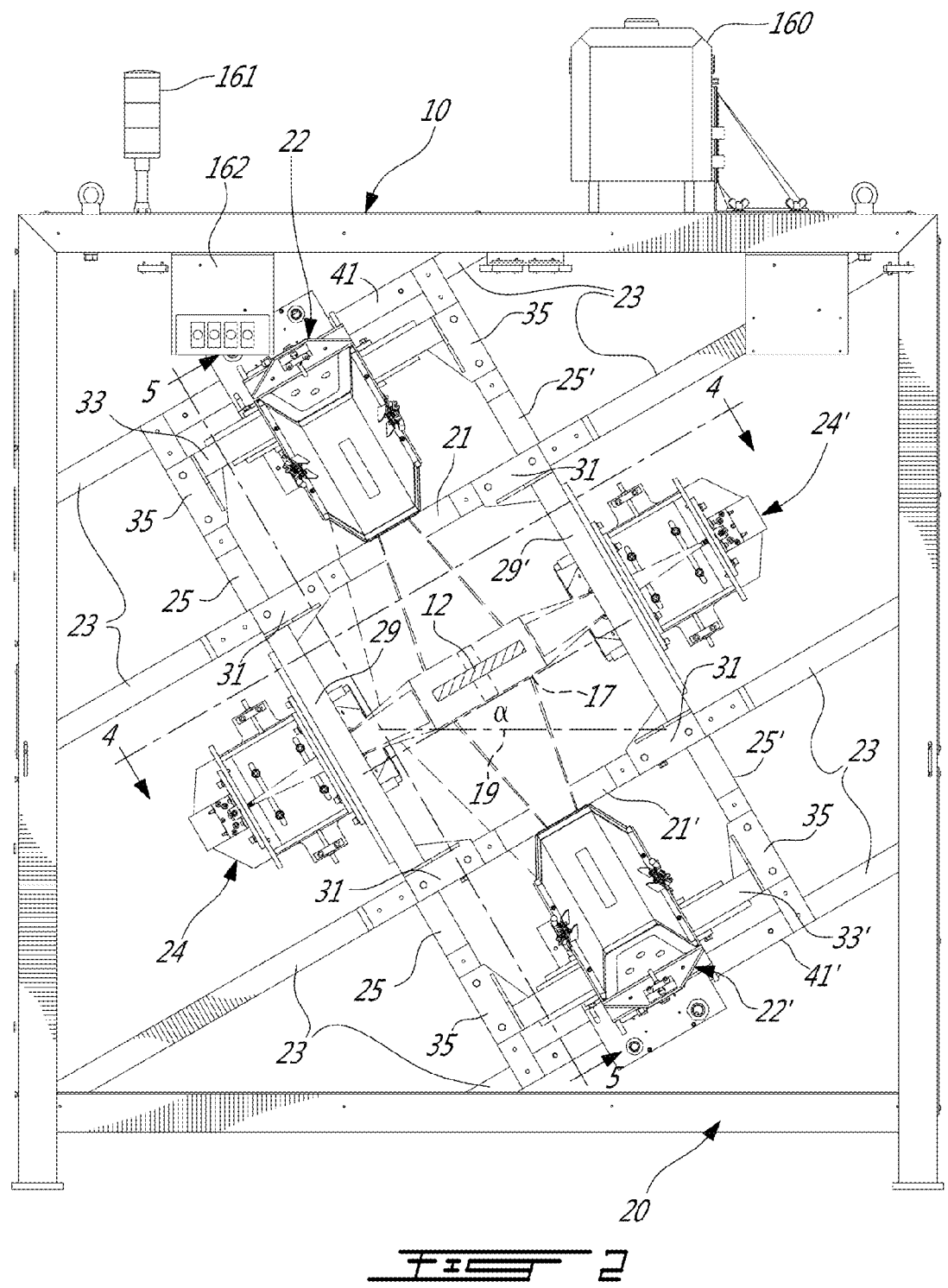
FIG. 2 is a front view of the apparatus of FIG. 1 with its access doors and conveyer units being not illustrated to better show the internal optical and mechanical components of the apparatus.
Figure 3:
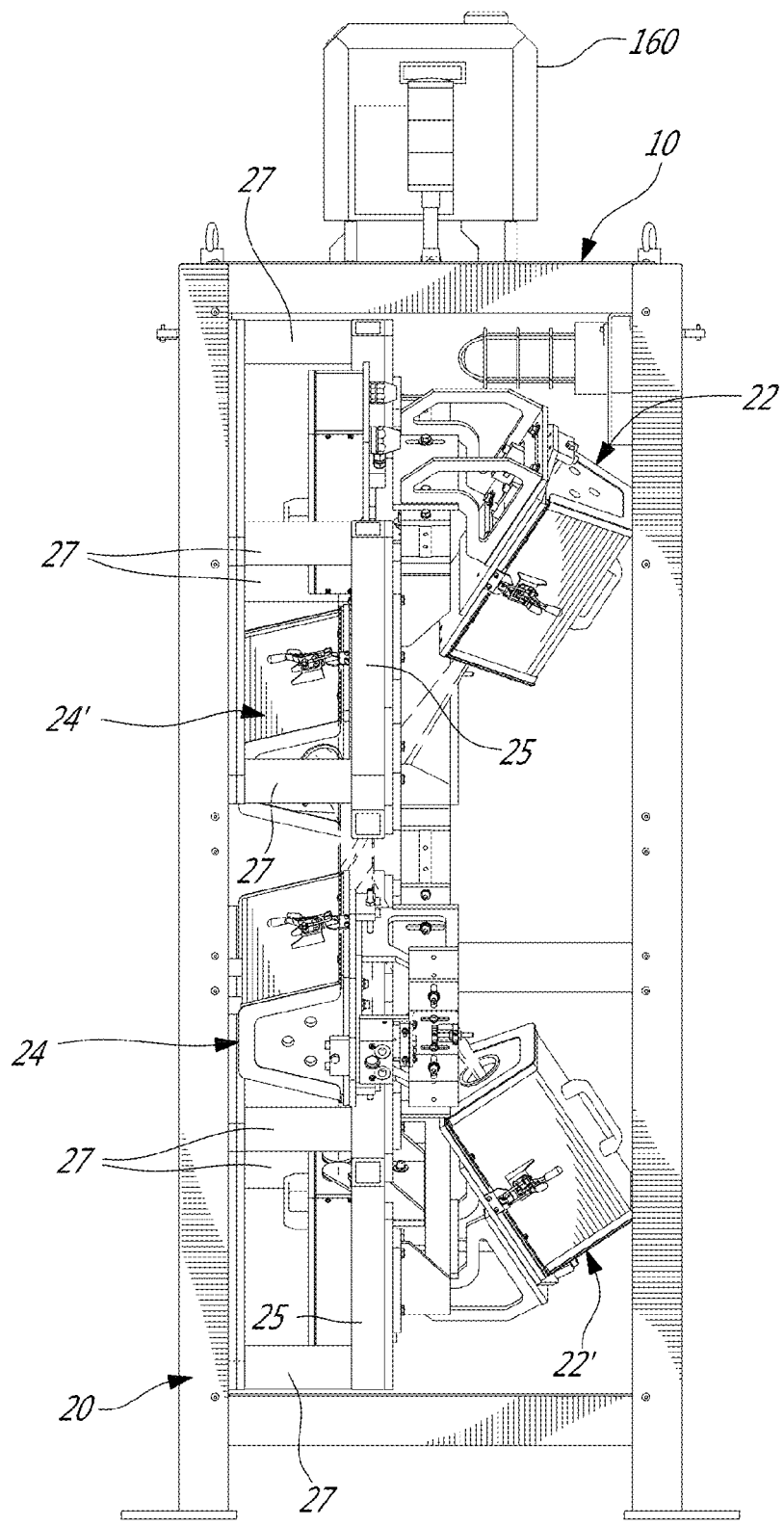
FIG. 3 is a side view of the apparatus of FIG. 1 with its enclosure wall and conveyer units being not illustrated to better show the internal optical and mechanical components of the apparatus.

As shown on FIG. 1 in view of FIG. 2, the apparatus 10 has an infeed conveyer unit 14 and an outfeed conveyer unit 16 for moving the board 12 to be inspected through the apparatus along a travel path axis 13 in the direction of arrow 18. In the present embodiment, the transporting plane of each conveyer unit 14,16, which is designated at 17 on FIG. 2, is preferably at an angle α of about 30° with respect to a horizontal plane designated at 19 so that a fed board 12 is caused to urge under gravity against a guide 15 provided on each conveyer unit 14,16. However, conveyers for transporting boards according to another orientation such as parallel to the horizontal plane could also be used, by providing appropriate adaptation. In the example shown, the apparatus 10 is particularly adapted to receive wooden boards from wood processing equipment capable of machining top, bottom and both side surfaces of each board, for inspection thereof. The apparatus 10 is provided with a frame 20 on which are mounted laser-based imaging sensor units 22, 22' and 24, 24', using pairs of cross-bars 25, 25' and a further pair of cross-bars 21, 21', which cross-bars are secured to frame bars 23 through members 27 shown on FIG. 3. The imaging sensor units 24, 24' are adjustably held on cross-bars 21, 21' using support members 29, 29', bolted at both ends 31 thereof. Conveniently, the imaging sensor units 22, 22' are adjustably held on respective pairs of cross-bars 25, 25' using support members 33, 33' bolted at both ends 35 thereof. Further cross-bars 41, 41', are provided to strengthen the mounting arrangement. It is to be understood that any other configuration of mounting arrangement can be used to adjustably secure the imaging sensor units onto the apparatus frame 20. For safety purposes, the apparatus may include status indicating lights 161, and a panel 162 may be provided to indicate and allow control of operation status of the lasers used by the imaging sensor units 22, 22' and 24, 24'. A cooling system 160 may be provided to stabilize coherent light generation of the lasers by allowing cooling and temperature control thereof as will be described later in more detail in view of FIG. 10.

Referring again to FIG. 1, the apparatus 10 is protected and isolated from its working environment by an enclosure 26 having a peripheral portion formed by side walls 28, 28' top wall 30 and bottom wall 32 connected to the frame 20 and forming spaced apart front and rear peripheral edges 34, 34' defining a space in which the frame 20 and the imaging sensor units 22, 22' and 24, 24' are contained. Such known enclosure is disclosed in prior U.S. published Patent application No. 2012/0274758 A1 naming the same applicant, the entire content of which document being incorporated herein by reference. Conveniently, the enclosure 26 is provided at rear and front ends 36, 36' with pairs of access doors 40, 40' having outer closing edges 42, 42' adapted to mate with corresponding portions of the peripheral edges 34, 34', and inner closing edges 44, 44' adapted to mate one with another at first portions thereof, which, in the example shown, are located on the upper and lower parts of the doors 40, 40' and partially extend along opening plates 45, 45' provided thereon. As shown on FIG. 1, the peripheral edges 34 and 34' are conveniently provided at their respective upper and lower portions with holding rails 43 designed to engage corresponding upper and lower portions of the outer closing edges 42, 42' to allow sliding of access doors 40, 40' which are provided with bearings. It is to be understood that any other appropriate access door type, such as using hinges located on lateral portions of the peripheral edges 34, 34', could alternatively be used. The closing edges 44, 44' are provided with clearances 46, 46' to define a corresponding opening 38 whenever the access doors 40, 40' are brought one toward another from an open position as shown on FIG. 1 to a closing position, which opening 38 is aligned with the travel path axis 13 to allow the movement of board 12 through the apparatus 10.

For safety purposes, to minimize the risk that any reflected laser light leaks out through apparatus opening 38 and causes eye injury to plant operators, adjacent the clearance portion 46, the opening plate 45 is provided with a shielding element 48 attached to a holder 49 to confine reflections of the laser beams produced by the imaging sensor units 22, 22' and 24, 24' within the enclosure while allowing the movement of the board 12. The shielding element 48 may be made of any appropriate material, and preferably of a flexible material such as plastic, rubber or fabric, in any appropriate form such as a strip, curtain or brush, as a unitary piece or constituted of a plurality of elements such as fibres, provided it is sufficiently opaque to laser light. Optionally, for providing adaptation to various board dimension values (thickness in the example shown), the shielding element 48 may be rendered adjustable with respect to the closing edges 44 by providing the holder 49 with an appropriate mechanism, especially in a case where the material of which the shielding element is made is rigid, to minimize gaps through which reflected laser light may leak out, while ensuring unrestricted passage of boards through the apparatus.

A particular compact arrangement of the imaging sensor units as part of the apparatus 10 of the present example will now be described in detail with reference to the schematic sectional views of FIGS. 4 and 5. It can be seen that the conveyer units 14 and 16 are respectively provided with conveyer rolls 37, 37' which define, in the example shown, the limits of an inspection area 50 located at a central plane designated at 52 which is transverse to the travel path axis 13, and equidistant to the conveyer rolls 37 and 37'. It can be appreciated that the spacing between conveyer rolls 37 and 37' determines the minimum length a board 12 must have in order to be longitudinally transported through the inspection apparatus. Therefore, in order to accept a wide range of board lengths (in direction of Y axis on the reference system 39), the conveyer rolls spacing has to be minimized, while leaving the optical clearance required by the scanning of board of various widths (in direction of X axis on the reference system 39). The width of the transporting surface of the conveyer units 14 and 16, starting from the guide 15, is made sufficient to provide board feeding adaptation to boards of various width values, up to the largest board width limit indicated in dotted lines 30 adjacent the imaging sensor unit 24' also represented in dotted lines on FIG. 4. It is to be understood that in any case where the conveyers for transporting boards 12 are designed to work without a guide 15 extending within the adjacent to the inspection area 50, for example according to another orientation such as parallel to the horizontal plane, the conveyer width may extend on the other side of the travel path axis 13 toward imaging sensor unit 24, up to a further board width limit as indicated by dotted line 30'.

It can be seen from FIG. 5 that the first imaging sensor unit 22 represented in dotted lines includes a first digital camera 51 having a first optical sensing field 53 directed toward the travel path axis 13 and defining a first scanning zone 54 associated with a first board surface 56 (top surface in the example shown) as intersected by the first sensing field 53. A detailed description of a first imaging sensor unit 22 according to the present example of scanning apparatus will be provided below in view of FIGS. 8 to 10. A digital 3D camera such as model C3-2350 from Automation Technology Gmbh (Germany) may be used. The first imaging sensor unit 22 also includes a first linear laser source 58 characterized by a first laser wavelength for directing at an angle with the first sensing field 53 a first linear-shaped laser beam 55 toward the scanning zone 54 to form a first reflected laser line 60 onto the object surface, as shown in FIG. 4. The laser beam 55 defines an associated scanning plane transverse (within plane X-Z in reference system 39) to the travel path axis 13 in the example shown. Accordingly, the digital camera 51 having its sensing field 53 intersected by the board surface 56 onto which first laser line 60 is reflected, the latter is captured by the camera 51 which generates reflected laser intensity image data. For example, the first laser wavelength can be selected within a red wavelength range, such as from about 620 to 660 nm. The fan angle of the laser source 58 may be chosen so that sufficient reflected beam intensity is obtained on board surface 56 in scanning zone 54, to be properly captured by the camera used. A 630 nm compact laser from Osela Inc. (Pointe-Claire, Quebec, Canada) with transverse fan angle of about 30° may be used to obtain sufficient reflected beam intensity when the apparatus 10 shown in FIGS. 1 to 4 is used. It is to be understood that any other appropriate laser available in the marketplace can be used.

Turning again to FIG. 5, the first imaging sensor unit 22 also includes a second linear laser source 59, which is designated by dotted reference numeral line to indicate that it is adjacently disposed behind first linear laser source 58 in the schematic representation shown. It is to be understood that the respective positions of the first and second laser sources 58, 59 may be permutated so that the first one would be behind the second one, without changing the operation principle of the imaging sensor unit 22. Such permutation is shown in the example described below in reference to FIGS. 8 to 10. The second linear laser source 59 is characterized by a second laser wavelength, for directing at an angle with the first sensing field 53 a second linear-shaped laser beam 67 toward the scanning zone 54 to form a second reflected laser line 60' onto the object surface 56, as designated by dotted reference numeral line in FIG. 4. Turning back to FIG. 5, the second linear laser source 59 defines an associated scanning plane transverse to the travel path axis 13 in the example shown, which is the same as the plane defined by the first linear laser source 58, and the second laser beam 67 is thus designated by a dotted reference numeral line to indicate that it is coplanar with the first beam 55 in the schematic representation shown. In other words, for the apparatus of the present example, the linear laser sources 58, 59 may be disposed so that their respective laser beams 55, 67 share a same scanning plane extending transversely to travel path axis 13. In order to project their respective beams toward the same target scanning zone 54, in a substantially same direction and orientation within the common scanning plane, the first and second linear laser sources 58, 59 are adjacently disposed so that their linear-shaped beams are aligned within the scanning plane and extend sufficiently to cover the entire target scanning zone 54, as will be described later in more detail with reference to FIG. 9. Is to be understood that any other appropriate optical configuration may be used to have the laser sources 58, 59 projecting their respective beams toward the same target scanning zone 54.

Furthermore, the linear laser sources 58, 59 may be adjacently disposed at a substantially same distance from the scanning zone 54. In the present example, the second laser wavelength can be selected within a green wavelength range, such as from about 510 to 540 nm. Here again, the fan angle of the second linear laser source 59 may be chosen so that sufficient reflected beam intensity is obtained on board surface 56 in scanning zone 54, to be properly captured by the camera used. Conveniently, the linear laser sources 58, 59 are characterized by respective fan angles selected to produce substantially same level of light intensity at the scanning zone 54. A 515 nm laser such as model 3R 100-0037 from Osela inc. (Pointe-Claire, Quebec, Canada) with transverse fan angle of about 10° may be used to obtain sufficient reflected beam intensity for the apparatus shown in FIGS. 1 to 4. It is to be understood that any other appropriate linear laser available in the marketplace can be used. Here again, the digital camera 51 having its sensing field 53 intersected by the board surface 56 onto which second laser line 60' is reflected, the latter is captured by the camera 51, alternately with the first reflected laser line 60, to produce interlaced sequences of reflected laser intensity image data, as the board is conveyed through the scanning unit. For so doing, as shown in FIG. 6, the apparatus 10 is provided with a laser control device 71 receiving through line 111 exposure control signal from camera 51 and operatively connected through lines 156, 158 to first and second laser sources 58, 59 for activating thereof alternately according to a predetermined frequency.

Figure 7:
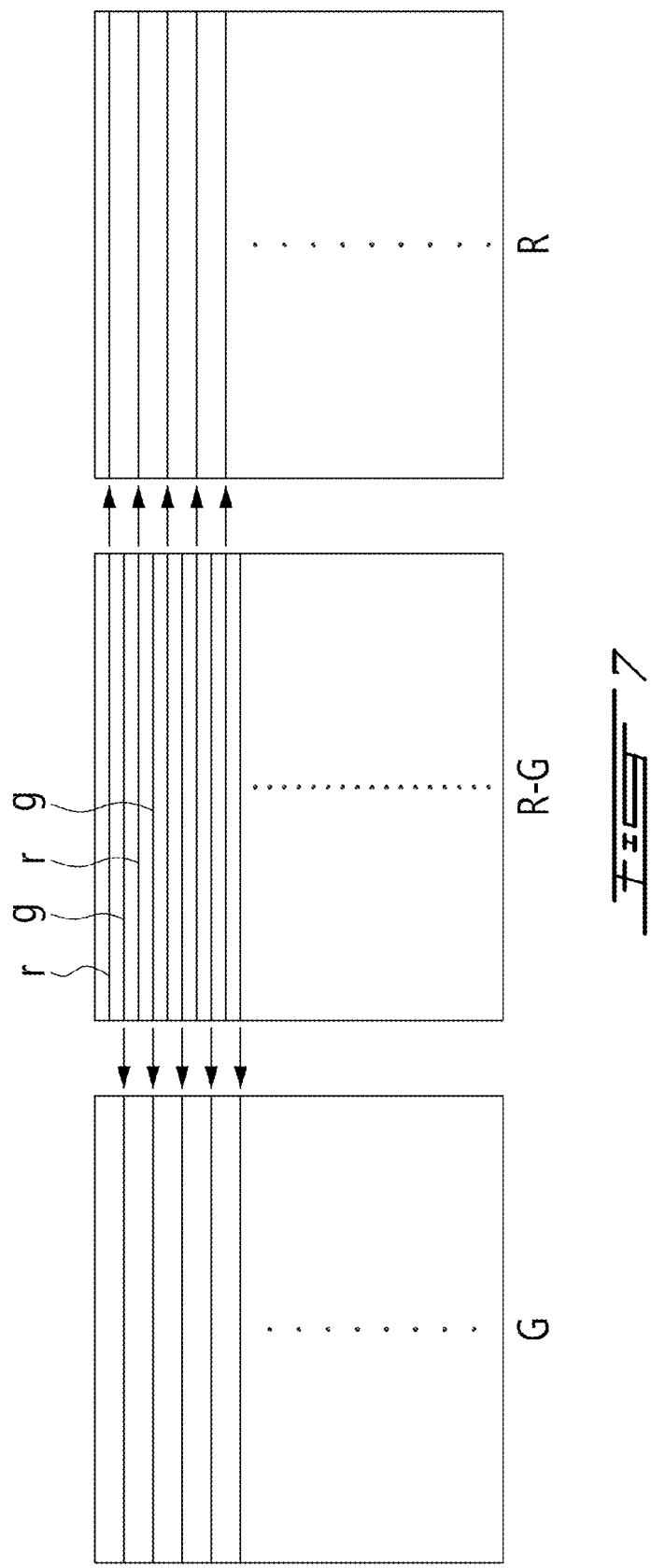
FIG. 7 is a schematic representation of a separating step applied to interlaced reflected laser intensity image data.
Figure 11A:
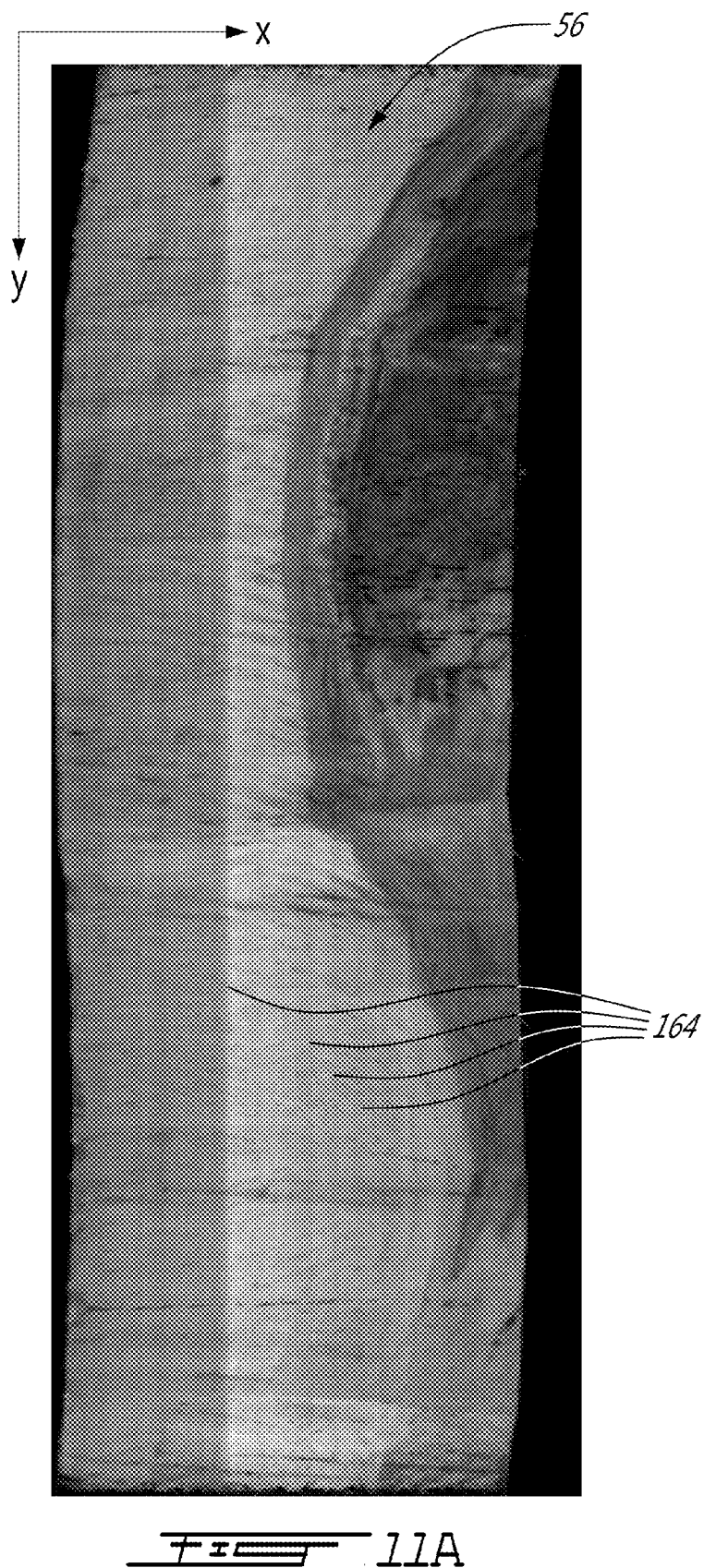
FIGS. 11A and 11B illustrate an example of image noise filtering, respectively showing a raw image of the surface of an inspected object and a filtered image of the same surface.

The apparatus 10 schematically shown in FIG. 6 further includes data processing means that can be in the form of a computer 69 provided with suitable memory and programmed for separating the interlaced sequences of reflected laser intensity image data designated at 150 to generate two complementary color image frames designated at 152, 154 representing the surface of the board 12, as will be now explained in view of FIG. 7. Although the computer 69 may conveniently be a general-purpose computer, an embedded processing unit such as based on a digital signal processor (DSP), can also be used to perform image frames generation. According to a proposed separating step, the interlaced sequences of image data is de-interlaced by image processing to provide two distinct image frames of substantially the same board surface, provided the raster pitch (i.e. the resulting spacing between the interlaced image lines) is sufficiently small, while providing acceptable image resolution. In the example shown, the image lines designated by "r" as obtained from a first, red wavelength laser, are extracted from the interlaced sequences of image data "R-G" to generate a first de-interlaced color image frame "R", and the image lines designated by "g" as obtained from a second, green wavelength laser, are extracted from the interlaced sequences of image data "R-G" to generate a second de-interlaced color image frame "G". For example, with a typical board feeding speed of 2500 mm/s, an activation frequency of 2500 Hz or more can be used to provide a maximum raster pitch of 1 mm in the interlaced image data, from which two de-interlaced color image frames of 2 mm or better resolution can be generated. An example of de-interlaced image of the surface 56 of an inspected board is shown in FIG. 11A, wherein low frequency image noise caused by irregularity of illumination can be observed along linear laser scanning direction X. In the example shown, considering that a substantially constant noise profile along direction X is repeating for successive image lines along direction Y, this results in visible image bands 164 extending along direction Y, characterized by either darker or lighter intensities as compared with the neighbouring surface areas.

Figure 7A:
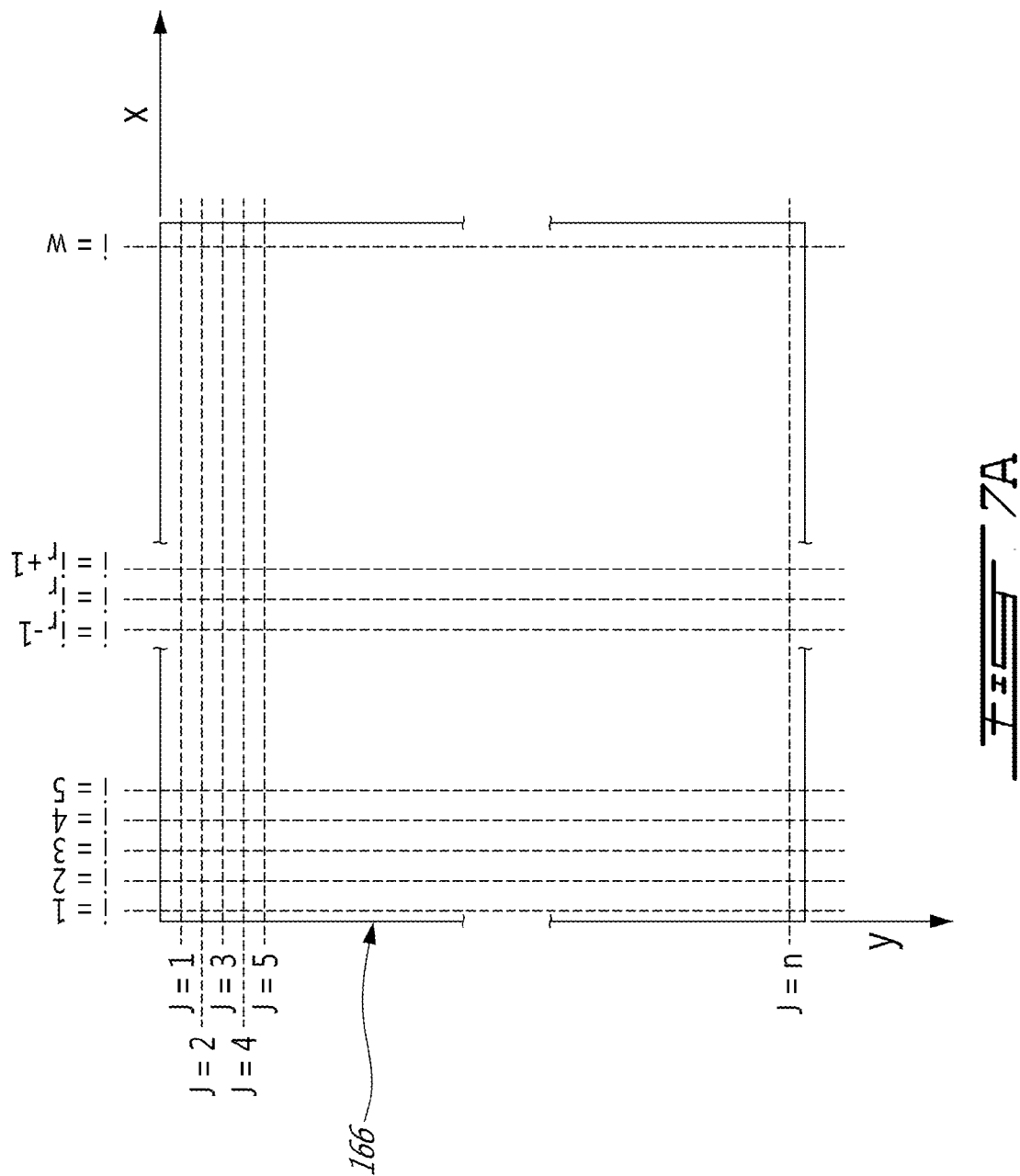
FIG. 7A is a schematic representation of a reflected intensity image matrix to be subjected to a noise filtering method.
Figure 11B:

Referring now to FIG. 7A, embodiments of a proposed method for filtering low frequency noise from the image, without adversely affecting the portion of image data representing actual changes in reflection characteristics of the scanned surface, will now be described. Conveniently, a same data processing means in the form of computer 69 used for image frames generation may be further programmed to perform filtering of low frequency noise from the generated images. It is to be understood that a separate general purpose computer or embedded processing unit such as based on a digital signal processor (DSP), can also be used to perform image filtering. In FIG. 7A, there is schematically represented a reflected intensity image matrix generally designated at 166 to be subjected the proposed noise filtering method, which reflected intensity providing an indication of the surface characteristics of the inspected object, which is a wooden board in the present example. The image matrix 166 is expressed with reference to orthogonal first and second axis X and Y, and is obtained with linear light scanning along X axis, as described above, and more particularly with linear laser scanning in the context of the present example. The image matrix 166 of the example shown is expressed in terms of line image vectors designated j=1 to h along Y axis, which is parallel to travel path direction in the example described above, wherein h is the number of image lines. The image matrix 166 is further expressed in terms of column image vectors designated i=1 to w along X axis parallel to laser scanning direction within the scanning plane, wherein w is the number of image columns. An embodiment of the proposed method involves a first step of calculating the difference between pixel values for Y coordinates j=1 to h of an image column vector for X coordinate $i=i_r+1$ or $i=i_r-1$ adjacent a reference image column vector for X coordinate $i=i_r$ selected from X coordinates i=1 to w, and respective pixel values for Y coordinates j=1 to h of the selected image column vector to obtain a pixel difference vector for Y coordinates j=1 to h. Then, a following step consists of comparing each coordinate value of the pixel difference vector with a predetermined threshold T to select the pixel difference values not mainly associated with a corresponding atypical change of surface characteristics as compared with noise. In other words, the probability that a pixel difference beyond the value assigned to threshold T would be due to noise is practically null. Then, a following step consists of calculating a mean value M from the N selected pixel difference values as an estimated value of the noise. Thereafter, the method follows with subtracting the estimated noise value from the adjacent image column vector for X coordinate $i=i_r+1$ or $i=i_r-1$ to obtain a corrected image column vector. All of the above steps are then repeated using the corrected image vector as the reference image column vector for X coordinate $i=i_r$ and a further adjacent image column vector for X coordinate $i=i_r+1$ or $i=i_r-1$ within i=1 to w to obtain further corrected image column vectors. The method ends with generating a filtered image from the obtained corrected image column vectors. Referring to FIG. 11B, there is shown a resulting filtered image obtained after processing of the raw image of FIG. 11A referred to above, in view of which it can be appreciated that image bands that were previously visible on the raw image have been substantially filtered out. It is to be understood that while the selection of the reference image column vector for X coordinate $i=i_r$ as a starting point of the method may be arbitrary, it could be important in some cases to avoid selecting the reference column in image areas likely to contain less reliable pixel data, such as corresponding to irregular edges of the scanned object surface. Therefore, the reference column may be conveniently selected within a central portion of the image, and the filtering method is performed according to forward (involving coordinates $i=i_r+1$) and backward (involving coordinates $i=i_r-1$) sequences of processing steps from the selected reference image column. Otherwise, starting either forward from first (i=1) column or backward from last (i=w) column, the whole image data can be filtered accordingly. In other cases, it could be desired to filter only a portion of the image data using the proposed method. The basic image noise filtering method as described above may be readily programmed in the computer 69 provided on the scanning apparatus 19 as schematically represented in FIG. 6.

Conveniently, the threshold T may be predetermined experimentally by scanning a board presenting typical characteristics to obtain a reflected intensity image, by calculating one or more pixel difference vectors, whose absolute values (irrespective of difference sign) are used to obtain a mean value, which can be multiplied by a given tolerance factor to obtain the threshold. The proposed method performs image noise filtering, without adversely affecting the portion of image data representing actual changes in reflectance characteristics of the scanned surfaced. The total signal $S_t$ value of each image pixel can be expressed as:

$$S_t = S_s + S_n$$

wherein $S_s$ is the portion of the total signal value associated with the surface characteristics of the scanned object, and $S_n$ is the portion of the total signal value associated with noise, assuming the latter is of a sufficiently low frequency to be considered near-constant within any image column. Assuming that the reflectance characteristics as measured on the surface of an object shows an ergotic behavior (near-stationary), the expected (mean) value of $S_s$ is substantially the same for each image column. Therefore, the expected value for difference between pairs of corresponding pixels (5) within adjacent image columns can be directly estimated from the expected value for difference between $S_n$ of the corresponding pixels. Since such estimation is valid only if $S_s$ does not present abrupt changes of expected value, i.e. likely to be associated with a corresponding atypical change of surface characteristics as compared with noise as mentioned above, a threshold is applied to select the pixel difference values not mainly associated with such atypical changes, to be used in the estimation.

An example of computer programmed algorithm that can be used to perform the proposed image filtering method is as follows:

from a selected reference image column vector for X coordinate with $i_r=w/2$ for w even or $i_r=(w+1)/2$ for w odd, toward the adjacent image column vector for X coordinate $i=i_r+1$:

```
for (i = w /2 or (w+1)/2 to i = w)
{
  N = M = 0;
  for (j = 1 to j = h)
  {
    If (|p_{i+1,j} −p_{i,j}| < T)
    { N = N+1
      M = M + (p_{i+1,j} −p_{i,j})
    }
    j = j + 1
  }
  M = M / N;
  for (j = 1 to j = h)
  {
    p_{i+1,j} = p_{i+1,j} − M
    j = j+1
  }
  i = i + 1
}
``` and from a selected reference image column vector for X coordinate with $i_r=w/2$ for w even or $i_r=(w+1)/2$ for w odd, toward the adjacent image column vector for X coordinate $i=i_r-1$:

```
for (i = w /2 or (w+1)/2 to i = 1)
{
  N = M = 0;
  for (j = 1 to j = h)
  {
    If (|p_{i−1,j} −p_{i,j}| < T)
    { N = N+1
      M = M + (p_{i−1,j}−p_{i,j})
    }
    j = j + 1
  }
  M = M / N;
  for (j = 1 to j = h)
  {
    p_{i−1,j} = p_{i−1,j} − M
    j = j+1
  }
  i = i − 1
}
``` wherein: w is the number of column in the image;

h is the number of lines in the image;

N is a number of selected pixel difference values;

M is a mean value estimating the noise;

$p_{i,j}$ is pixel value of column and line coordinates i,j.

A first numerical example involving the above algorithm applied to the 5×5 image matrix shown in Table 1, and using a threshold T=50 will now be presented.

TABLE 1

| 1 | 2 | 3 | 4 | 5 |
|---|---|---|---|---|
| 200 | 210 | 190 | 210 | 200 |
| 160 | 155 | 150 | 160 | 140 |
| 210 | 220 | 190 | 40 | 170 |
| 200 | 160 | 140 | 130 | 145 |
| 140 | 140 | 135 | 155 | 180 |

Starting from a selected reference image column vector for X coordinate $i_r=(w+1)/2=3$ toward the adjacent image column vector for X coordinate $i=i_r+1$:

The calculation of differences between pixel values for column 4 and 3 gives:

210−190=20

160−150=10

40−190=−150

130−140=−10

155−135=20

The differences 20, 10, −10 and 20 are selected, while difference −150, whose absolute value is beyond the threshold, is discarded. The calculated mean value (40/4=10) which estimates the image noise is then subtracted from the pixel values of column 4 to generate corrected column 4:

210−10=200

160−10=150

40−10=30

130−10=120

155−10=145

Then, the calculation of differences is repeated between pixel values for column 5 and corrected column 4 as follows:

200−200=0

140−150=−10

170−30=140

145−120=25

180−145=35

The differences 0, −10, 25 and 35 are selected, while difference 140, whose absolute value is beyond the threshold, is discarded. The calculated mean value (50/4=12.5) which estimates the image noise is then subtracted from the pixel values of column 5 to generate corrected column 5:

200−12.5=187.5

140−12.5=127.5

170−12.5=157.5

145−12.5=132.5

180−12.5=167.5

Hence, starting again from the selected reference image column vector for X coordinate $i_r=(w+1)/2=3$ toward the adjacent image column vector for X coordinate $i=i_r-1$:

The calculation of differences between pixel values for column 2 and 3 gives:

210−190=20

155−150=5

220−190=30

160−140=20

140−135=5

All the calculated differences having their respective absolute values under the threshold, they are all selected, and the mean value (80/5=16) which estimates the image noise is then subtracted from the pixel values of column 2 to generate corrected column 2:

210−16=194

155−16=139

220−16=204

160−16=144

140−16=124

Finally, the calculation of differences between pixel values for column 1 and corrected column 2 gives:

200−194=6

160−139=21

210−204=6

200−144=56

140−124=16

The differences 6, 21, 56 and 16 are selected, while difference 56, whose absolute value is beyond the threshold, is discarded. The calculated mean value (49/4=12.25) which estimates the image noise is then subtracted from the pixel values of column 1 to generate corrected column 1:

200−12.25=187.75

160−12.25=147.75

210−12.25=197.75

200−12.25=187.75

140−12.25=128.75

The pixel values of the resulting noise filtered image are given in Table 2.

TABLE 2

| 1 | 2 | 3 | 4 | 5 |
|---|---|---|---|---|
| 187.75 | 194 | 190 | 200 | 187.5 |
| 147.75 | 139 | 150 | 150 | 127.5 |
| 197.75 | 204 | 190 | 30 | 157.5 |
| 187.75 | 144 | 140 | 120 | 132.5 |
| 128.75 | 124 | 135 | 145 | 167.5 |

Another embodiment of the basic image noise filtering method as described above will now be presented, which embodiment could be particularly appropriate in cases where noise of very low frequency may affect image data. For example, depending on the type of object being inspected, a background gradual variation of image intensity along the light scanning axis that is not likely to be associated with a surface characteristic inherent to the object surface, may correspond to noise content caused by irregularity of illumination due to misalignment of the linear light source or to other anomaly. Basically, that alternative embodiment of the method involves the same basic image processing steps as described above, with the incorporation of two further processing steps involved when repeating the steps described above, which uses the corrected image vector as the reference image column vector for X coordinate $i=i_r$ and a further adjacent image column vector for X coordinate $i=i_r+1$ or $i=i_r-1$ within $i=1$ to w to obtain the further corrected image column vectors from which the filtered image is generated. At each repetition, a cumulative mean value is calculated from the previously calculated mean value. As part of the difference calculating step, the cumulative mean value is subtracted from the pixel values for Y coordinates $j=1$ to h of the adjacent image column vector for X coordinate $i=i_r+1$ or $i=i_r-1$. The subtraction resulting values are used to calculate the difference with the respective pixel values for X coordinates $j=1$ to h of the selected image column vector to obtain the pixel difference vector for X coordinates $j=1$ to h. In that manner, a cumulative correction based on the cumulative mean value may be spread to following adjacent column vectors, providing improved attenuation of very low frequency noise, while allowing the use of a lower threshold value if desired.

A second example of computer programmed algorithm that can be used to perform the proposed image filtering method according to that alternative embodiment is as follows:

from a selected reference image column vector for X coordinate with $i_r=w/2$ for w even or $i_r=(w+1)/2$ for w odd, toward the adjacent image column vector for X coordinate $i=i_r+1$:

```
C = 0
for (i = w /2 to i = w)
{
  N = M = 0;
  for (j = 1 to j = h )
  {
    p_{i+1,j} = p_{i+1,j} - C
      If (|p_{i+1,j} -p_{i,j}| < T)
      { N = N+1
        M = M + (p_{i+1,j} -p_{i,j})
      }
    j = j + 1
  }
  M = M / N;
  C = C + M
  For (j = 1 to j = h)
  {
    p_{i+1,j} = p_{i+1,j} - M
    j = j+1
  }
  i = i + 1
}
``` and from a selected reference image column vector for X coordinate with $i_r=w/2$ for w even or $i_r=(w+1)/2$ for w odd, toward the adjacent image column vector for X coordinate $i=i_r-1$:

```
C = 0
for (i = w /2 to i = 1)
{
```

-continued

```
N = M = 0;
for (j = 1 to j = h)
    {
    p_{i-1,j} = p_{i-1,j} - C
        If (|p_{i-1,j} - P_{i,j}| < T)
        { N = N+1
        M = M + (p_{i-1,j} - P_{i,j})
        }
    j = j + 1
    }
M = M / N;
C = C + M
for (j = 1 to j = h)
    {
    p_{i-1} = p_{i-1} - M
    j = j+1
    }
i = i - 1
}
``` wherein: w is the number of column in the image;
h is the number of lines in the image;
N is a number of selected pixel difference values;
M is a mean value estimating the noise;
$p_{i,j}$ is pixel value of column and line coordinates i,j;
C is the cumulative mean value.

A second numerical example involving in this case the above alternative algorithm applied to the same 5×5 image matrix shown in Table 1, and using a same threshold T=50 will now be presented. Starting from a selected reference image column vector for X coordinate $i_r=(w+1)/2=3$ toward the adjacent image column vector for X coordinate $i=i_r+1$:

The calculation of differences between pixel values for column 4 and 3 gives a same result as in first example involving the prior algorithm, with a mean value of 10, to generate a same corrected column 4:

210−10=200

160−10=150

40−10=30

130−10=120

155−10=145

Then, the calculation of differences is repeated between pixel values for column 5 and corrected column 4, but taking into account the cumulative mean value calculated from the previously calculated mean value, as follows:

(200−10)−200=−10

(140−10)−150=−20

(170−10)−30=130

(145−10)−120=15

(180−10)−145=25

The differences −10, −20, 15 and 25 are selected, while difference 130, whose absolute value is beyond the threshold, is discarded. The calculated mean value (10/4=2.5) which estimates the image noise is then subtracted from the pixel values of column 5 to generate corrected column 5:

190−2.5=187,5

130−2.5=127.5

160−2.5=157.5

135−2.5=132.5

170−2.5=167.5

In a case where a further column 6 were included in the image data, it can be appreciated that a cumulative mean value of 12.5 (i.e. 10+2.5) would be used in the difference calculation step.

Hence, starting again from the selected reference image column vector for X coordinate $i_r=(w+1)/2=3$ toward the adjacent image column vector for X coordinate $i=i_r-1$:

The calculation of differences between pixel values for column 2 and 3 gives a same result as in first example involving the prior algorithm, with a mean value of 16, to generate a same corrected column 2:

210−16=194

155−16=139

220−16=204

160−16=144

140−16=124

Then, the calculation of differences is repeated between pixel values for column 1 and corrected column 2, but taking into account the cumulative mean value calculated from the previously calculated mean value, as follows:

(200−16)−194=−10

(160−16)−139=5

(210−16)−204=−10

(200−16)−144=40

(140−16)−124=0

All the calculated differences having their respective absolute values under the threshold, they are all selected, and the mean value (25/5=5) which estimates the image noise is then subtracted from the pixel values of column 1 to generate corrected column 1:

184−5=179

144−5=139

194−5=189

184−5=179

124−5=119

The pixel values of the resulting noise filtered image are given in Table 3.

TABLE 3

| 1 | 2 | 3 | 4 | 5 |
|---|---|---|---|---|
| 179 | 194 | 190 | 200 | 187.5 |
| 139 | 139 | 150 | 150 | 127.5 |
| 189 | 204 | 190 | 30 | 157.5 |
| 179 | 144 | 140 | 120 | 132.5 |
| 119 | 124 | 135 | 145 | 167.5 |

Then, the filtered data of color image frames can be analyzed separately or in combination to detect board characteristics. In the latter case, the data processing means may be further programmed to compare the complementary color image frames one with another to detect one or more characteristics of the board surface. For example, the comparison may consist of dividing one of the complementary color image frames by the other and comparing the division resulting image data with a predetermined threshold, which can allow improved detection capabilities over analysis of single color intensity data. As an illustration in a context of inspection of boards made of red oak, while the analysis of single color intensity data obtained through red wavelength laser illumination may reliably discriminate between dark and pale areas, such analysis may not distinguish sapwood areas, generally characterized by grey shade, from heartwood areas that are rather of red shade, since such sapwood and heartwood areas can seem both dark or pale on the basis of single color intensity data. However, by dividing one of the complementary color image frames by the other on a pixel by pixel basis, e.g. color image R/color image G, and comparing the division resulting image data with a predetermined threshold T', discrimination may be obtained considering that the mean intensity ratio R/G of grey shade characterizing a sapwood area on a board made of red oak wood is significantly lower to typical red shade area characterizing a heartwood area on the same board. In practice, the mean intensity ratio R/G of grey shade being near 1 (i.e. red intensity substantially equates green intensity), a threshold T'=1 may be used, so that a heartwood area is detected whenever R/G>1.

Assuming that the board is moving at known speed or position/time data along the travel path axis, the data processing means is further programmed for assembling the reflected laser intensity image data with corresponding data representing sensed location on the board surface, so that the detection of the characteristics may include data relating to identification and location thereof. In the case where profile-related image data are produced simultaneously to the interlaced sequences of reflected laser intensity image data, the assembling task is performed accordingly in a same manner. Optionally, in order to generate full color (RGB) image data, a third laser source generating light in the blue wavelength range may be added to obtain a third color image frame. Alternatively, a blue (B) image may be estimated from known reflectance characteristics of the board material at a typical blue wavelength, to allow generation of a color (RGB) image for displaying purposes.

Turning back to FIG. 5, according to the shown example, the first imaging sensor unit 22 is provided with a data processing module 57 programmed to generate, along with the reflected laser intensity image data, output data related to the profile of the board surface 56 through triangulation ranging, which profile is associated with a reference axis (axis Z in reference system 39) orthogonal to a reference plane (plane X-Y in reference system 39) parallel to the travel path axis. For so doing, the digital camera 51 captures alternately two-dimensional images of the first and second reflected laser lines 60, 60' formed by the laser beams 55 and 67 onto the first surface 56, from which images the data processing module 57 derives the profile-related output, involving calculation of the center of gravity of the laser beam image, or any other appropriate algorithm. For example, the imaging sensor unit may use a same laser triangulation ranging approach as disclosed in U.S. Pat. No. 7,429,999 issued to same applicant, the entire content of which document is incorporated herein by reference. Conveniently, the reflected laser intensity image data may be derived by integration of the measured intensity under the transverse laser line profile, i.e. extending transversely to the travel path axis 13, which transverse profile can be delimited on both side of its peak by applying a minimum intensity threshold. It is to be understood that any other appropriate technique can be used to generate the reflected laser intensity image data. The processing module 57 can be wholly or partially integrated into the digital camera 51, or be part of a computer system interfaced with the camera to receive and process raw image signals.

Turning back to FIG. 4, there is shown a second imaging sensor unit 24 represented in dotted lines including a second digital camera 61 having a second optical sensing field 63 directed toward the travel path axis 13 and defining a second scanning zone 64 associated with a second board surface 66 (left side in the example shown) adjacent to first (top) board surface 56, the second scanning zone 64 being intersected by the second sensing field 63. According to an embodiment of the scanning apparatus, the mechanical design of the second imaging sensor unit 24 may be similar to the one disclosed in U.S. published application No. 2012/0274758 A1 in view of FIGS. 10 to 11 thereof, naming the same applicant, the entire content of which document being incorporated herein by reference. A digital 3D camera such as model C3-2350 from Automation Technology Gmbh (Germany) may also be used, preferably provided with a "Scheimpflug" adapter for amplifying the optical depth of field of the imaging sensor unit 24 to provide inspection capability of the apparatus to boards of various widths, as will be described later in more detail. In the embodiment shown, the second imaging sensor unit 24 includes a single laser source 68 directing at an angle with the second sensing field 63 a linear-shaped laser beam 65 toward the scanning zone 64 to define an associated scanning plane transverse (within plane X-Z in reference system 39) to the travel path axis 13. For products such as flooring wood, side surfaces are not intended to be visible in use, and obtaining two complementary color image frames to detect aesthetical surface characteristics such as heartwood and sapwood areas, might not be necessary. In these cases, the reflected laser intensity image data can be obtained from single-color image frames. However, although the second imaging sensor unit 24 according to the embodiment shown in FIG. 4 uses a single linear laser source 68, it is to be understood that a pair of laser sources as provided on the first imaging sensor 22 of FIG. 5 could also be used. A similar laser source as either of those provided on the first imaging sensor unit 22 may be used, with transverse fan angle of about 10°. The second imaging sensor unit 24 is also provided with a data processing module 57 programmed to generate, along with the reflected laser intensity image data, output data related to the profile of the second board surface 66 through same triangulation ranging approach employed by the first imaging sensor unit 22, which profile is in this case associated with a reference axis (axis X in reference system 39) orthogonal to a reference plane (plane Z-Y in reference system 39) parallel to the travel path axis 13.

Referring again to FIG. 5 in view of FIG. 4, it can be appreciated that the first and second imaging sensor units 22, 24 in the embodiment shown are conveniently disposed one with respect to another so that their respective first and second scanning zones 54, 64 are sufficiently spaced one with another along the travel path axis 13 to substantially prevent mutual scanning interference between first and second imaging sensor units. In the example shown, since first (top) and second (left side) surfaces 56, 66 are adjacent one with another, the scanning plane associated with laser beams 55 and 67 and the scanning plane associated with the laser beam 65 are offset by a distance "d" in order to prevent illumination interference that would otherwise be caused by laser beams 55 and 67 in scanning zone 54 on the camera 61 of imaging sensor unit 24, and reciprocally by laser beam 65 in scanning zone 64 on the camera 51 of imaging sensor unit 22. It can be appreciated that although simultaneous scanning of the profile of the adjacent surfaces 56, 66 may be carried out, the first and second scanning planes being non coplanar due to the offset distance "d", the scanned areas on adjacent surfaces are consequently not coplanar with respect to the reference axis (axis Y on the reference system 39) parallel to the travel path axis 13. Therefore, there is a need for assembling respective output data generated by imaging sensor units 22 and 24, with corresponding data representing location along the travel path axis. A method for that purpose, which is based on the fact that the board is moving at known speed or position/time data along the travel path axis, is described in U.S. Pat. No. 8,193,481 B2 naming the same applicant, the entire content of which document being incorporated herein by reference. It is to be understood that any other appropriate data assembling technique can be used.

Furthermore, to provide a compact arrangement of first and second imaging sensor units 22 and 24, it can also be appreciated in the example illustrated on FIGS. 4 and 5, that the first sensing field 53 is crossing the central plane 52 toward the laser beams 55 and 67, whereas the second sensing field 63 is crossing the central plane 52 toward the laser beam 65. According to the imaging sensor configuration shown on FIGS. 4 and 5, the laser beams 55 and 67 are alternately directed toward the first scanning zone 54 within their associated scanning plane, and similarly, the laser beam 65 is directed toward the second scanning zone 64 within its associated scanning plane. This configuration allows minimizing the conveyer rolls spacing at a value near offset distance "d" while providing the optical clearance required by the scanning of boards within the desired ranges of board widths and lengths. In the example shown, the first (top) surface 56 is a main surface associated with a first dimension (width) transverse to the travel path axis 13 and of a value selected from a first range of dimension values. The second surface 66 is a side (left) surface associated with a second dimension (thickness) transverse to the travel path axis 13 and of a value selected from a second range of dimension values. According to the proposed compact configuration, the first optical sensing field 53 has a depth adapted to define the first scanning zone 54 for any selected value of second dimension (thickness), whereas the second optical sensing field 63 has a depth adapted to define the second scanning zone 64 for any selected value of first dimension (width).

According to an alternate configuration of imaging sensor units (not shown), the first sensing field 53 may be directed toward the travel path axis 13 within a first scanning plane (along Z axis of reference system 39), and similarly, the second sensing field 63 may be directed toward the travel path axis 13 within a second scanning plane. In that case, a similar compact arrangement can be obtained if the laser beams 55 and 67 are crossing the central plane toward the first sensing field 53, whereas the laser beam 65 is crossing the central plane toward the second sensing field 63.

While the proposed inspection apparatus may be basically used to scan two adjacent surfaces of an board by means of imaging sensor units 22 and 24, as mentioned above, the embodiment shown on FIGS. 1 to 5 is capable of simultaneously scanning four adjacent surfaces of an object, such as a wooden board also having a bottom surface 56' and a second side surface 66' (right side in the example shown) adjacent thereto. For so doing, third and fourth imaging sensor units 22' and 24' are provided according to a symmetrical configuration as compared to that which involves profile units 22 and 24 described above.

Referring again to FIG. 5, the third imaging sensor unit 22' represented in dotted lines includes a third digital camera 51' having a third optical sensing field 53' directed toward the travel path axis 13 and defining a third scanning zone 54' associated with the third board surface 56' (bottom surface in the example shown) as intersected by the third sensing field 53'. According to an embodiment of the scanning apparatus, the third imaging sensor unit 22' may be identical to the first imaging sensor unit 22, as will be described below in view of FIGS. 8 to 10. A same digital 3D camera such as the one provided on first imaging sensor unit 22 may be used, and similarly, the third imaging sensor unit 22' also includes a first laser source 58' characterized by the first laser wavelength for directing at an angle with the third sensing field 53' a first linear-shaped laser beam 55' toward the scanning zone 54' to form a first reflected laser line onto the bottom object surface 56'. The laser beam 55' defines an associated scanning plane transverse (within plane X-Z in reference system 39) to the travel path axis 13 in the example shown. Accordingly, the digital camera 51' having its sensing field 53' intersected by the bottom surface 56' onto which the laser line is reflected, the latter is captured by the camera 51' which generates reflected laser intensity image data, in a shown. Accordingly, the digital camera 51' having its sensing field 53' same manner as explained above regarding operation of camera 51, and a same model of first laser such as the one provided on first imaging sensor unit 22 may be used. The third imaging sensor unit 22' also includes a second laser source 59', which is designated by dotted reference numeral line to indicate that it is adjacently disposed behind first laser source 58' in the schematic representation shown in FIG. 5. The second laser source 59' is characterized by the second laser wavelength, for directing at an angle with the sensing field 53' a second linear-shaped laser beam 67' toward the scanning zone 54' to form a second reflected laser line onto the bottom surface 56'. The second laser source 59' defines an associated scanning plane transverse to the travel path axis 13 in the example shown, which is the same as the plane defined by the first laser source 58', and the second laser beam 67' is thus designated by dotted reference numeral line to indicate that it is coplanar with the first beam 55' in the schematic representation shown. Here again, the fan angle of the second laser source 59' may be chosen so that sufficient reflected beam intensity is obtained on bottom surface 56' in scanning zone 54', to be properly captured by the camera used. Here again, the digital camera 51' having its sensing field 53' intersected by the bottom surface 56' onto which the second laser line is reflected, the latter is captured by the camera 51', alternately with the first reflected laser line, to produce interlaced sequences of reflected laser intensity image data, by means of laser control device 71' as shown in FIG. 6, operatively connected to first and second laser sources 58', 59' for activating thereof alternately according to the predetermined frequency. The computer 69 is also programmed for separating the interlaced sequences of reflected laser intensity image data generated by camera 51 to generate two complementary color image frames representing the bottom surface 56' of board 12.

Turning back to FIG. 5, according to an embodiment, the third imaging sensor unit 22' is also provided with a data processing module 57 programmed to generate, along with the reflected laser intensity image data, output data related to the profile of the bottom surface 56' through triangulation ranging, in a same manner as explained above regarding the operation of first imaging sensor unit 22. For so doing, the digital camera 51' captures alternately two-dimensional images of the first and second reflected laser lines formed by the laser beams 55' and 67' onto the bottom surface 56', from which image the data processing module 57 derives the profile-related output, involving calculation of the center of gravity of the laser beam image as explained above. The reflected laser intensity image data may be derived by integration of the measured intensity under the transverse laser line profile, in a same manner as performed by the first imaging sensor unit 22. Here again, the processing module 57 can be wholly or partially integrated into the digital camera 51', or be part of a computer system interfaced with the camera to receive and process raw image signals.

Turning back to FIG. 4, a fourth imaging sensor unit 24' as represented in dotted lines includes a further digital camera 61' having an optical sensing field 63' directed toward the travel path axis 13 and defining a scanning zone 64' associated with a fourth board surface 66' (right side in the example shown) adjacent to third (bottom) board surface 56', the scanning zone 64' being intersected by the sensing field 63'. According to an embodiment of the scanning apparatus, the mechanical design of the fourth imaging sensor unit 24' may be similar to the one disclosed in U.S. published Patent application No. 2012/0274758 A1 in view of FIGS. 10 to 11 thereof, naming the same applicant. A same digital 3D camera model provided with a "Scheimpflug" adapter as used as part of the second imaging sensor unit 24 can be used. Similarly, the fourth imaging sensor unit 24' includes a single laser source 68' directing at an angle with the sensing field 63' a linear-shaped laser beam 65' toward the scanning zone 64' to define an associated second scanning plane transverse (within plane X-Z in reference system 39) to the travel path axis 13. A same laser model such as provided on second imaging sensor unit 24 may be used. The fourth imaging sensor unit 24' is also provided with a data processing module 57 programmed to generate, along with the reflected laser intensity image data, output data related to the profile of the fourth board surface 66' through same triangulation ranging approach employed by the second imaging sensor unit 24, which profile being also associated with the reference axis X in reference system 39 orthogonal to the reference plane parallel to the travel path axis 13.

Referring again to FIG. 5 in view of FIG. 4, it can be appreciated that the third and fourth imaging sensor units 22', 24' are also disposed one with respect to another so that their respective scanning zones 54', 64' are sufficiently spaced one with another along the travel path axis 13 to substantially prevent mutual scanning interference between third and fourth imaging sensor units. Here again, there is a need for assembling respective output data generated by imaging sensor units 22' and 24', with corresponding data representing location along the travel path axis 13. In the example shown, since third (bottom) and fourth (right side) surfaces 56', 66' are adjacent one with another, the scanning plane associated with the laser beams 55' and 67' and the scanning plane associated with the laser beam 65' are also offset by a distance "d" in order to prevent illumination interference that would otherwise be caused by either laser beam 55' or 67' in scanning zone 54' on camera 61' of imaging sensor unit 24' (as well as on camera 61 of imaging sensor unit 24), and reciprocally by laser beam 65' in scanning zone 64' on camera 51' of imaging sensor unit 22' (as well as on camera 51 of imaging sensor unit 22). Furthermore, to provide a similar compact arrangement as obtained with the first and second imaging sensor units 22 and 24 described above, it can also be appreciated in the example illustrated on FIGS. 4 and 5, that the sensing field 53' of imaging sensor unit 22' is crossing the central plane 52 toward the laser beam 55', whereas the sensing field 63' is crossing the central plane 52 toward the laser beam 65'. To provide compactness and optical clearance in same manner as performed by imaging sensor units 22 and 24 as explained above, the laser beams 55' and 67' are alternately directed toward the scanning zone 54' within their associated scanning plane, and similarly, the laser beam 65' is directed toward the second scanning zone 64' within its associated scanning plane. In the example shown, the third (bottom) surface 56' is a main surface associated with the same first dimension (width) transverse to the travel path axis 13 and of a value selected from the first range of dimension values. The fourth surface 66' is the other side (right) surface associated with the same second dimension (thickness) transverse to the travel path axis 13 and of a value selected from the second range of dimension values. Here again, according to the proposed compact configuration, the optical sensing field 53' has a depth adapted to define the scanning zone 54' for any selected value of second dimension (thickness), whereas the optical sensing field 63' has a depth adapted to define the scanning zone 64' for any selected value of first dimension (width).

In the example shown on FIGS. 4 and 5, for the sake of simplicity, the scanning planes associated with the first and third imaging sensor units 22, 24 are substantially coplanar, whereas the scanning planes associated with the second and fourth imaging sensor units 22', 24' are substantially coplanar. For so doing, the laser beams 55, 67 and 55', 67' are conveniently oriented toward top and bottom surfaces 56, 56' respectively, in aligned and opposed directions. Similarly, the laser beams 65, 65' are oriented toward first and second side surfaces 66, 66', respectively, in aligned and opposed directions. However, it is to be understood that any other appropriate configuration of scanning planes may be employed. According to an alternate configuration of the imaging sensor units (not shown), the sensing field 53' may be directed toward the travel path axis 13 within its corresponding scanning plane, and similarly, the sensing field 63' could be directed toward the travel path axis 13 within its corresponding scanning plane. In that case, a similar compact arrangement may be obtained if the laser beams 55', 67' are crossing the central plane toward the sensing field 53', whereas the laser beam 65' is crossing the central plane toward the sensing field 63'.

Referring now to FIGS. 8 and 9, there is illustrated an example of mechanical design for the imaging sensor unit 22, which can be also applied to imaging sensor unit 22', to be provided on the inspection apparatus described above in view of FIGS. 1 to 7, which FIGS. 8 and 9 shows a camera enclosure assembly generally designated at 70 and shown without its cover, which may be of the same design as disclosed in U.S. published application No. 2012/0274758 A1 naming the same applicant, the entire content of which document being incorporated herein by reference. The camera enclosure assembly includes an enclosure body 72 adapted to be secured to the apparatus frame through a mounting arrangement generally designated at 105, as better shown on FIG. 9. The mounting arrangement 105 has a back mounting plate 112 joined to lateral walls 113, 114 disposed in parallel spaced relationship and secured to a base mounting plate 115. As better seen from FIG. 9, the lateral walls 113, 114 are designed so that the back mounting plate 112 and the base mounting plate 115 form one with another a preset angle which is related to the angle at which the laser sources 58, 59 direct with respect to the optical sensing field 53 their respective linear-shaped laser beam 55, 67 toward the scanning zone 54. The base mounting plate 115 is provided with elongate apertures 123 for receiving bolts 126 providing position adjustment along axis Y on reference system 39, and is also adapted to be adjustably secured to a rail 117 using an intermediary plate 118 designed to fit onto a central groove 121 provided on the rail 117 for rough position adjustment along axis X of reference system 39. The rail 117 is in turn attached to the support member 33 for the imaging sensor unit 22 (or member 33' for unit 22' shown in FIG.2), whose ends 35 are attached to the cross-bars 25, 25' secured to frame bars 23 through members 27 as described above with reference to FIG. 2 in view of FIG. 3. As shown in FIG. 9, adjustably secured under support member 33 is a bottom plate 116 adapted to receive a mounting plate 125 having elongate openings for bolts (not shown), for lateral adjustment and securing of a flanged element 120 mechanically coupled to a device 122 for securing the dual laser assembly generally designated at 130, i.e. the arrangement of laser sources 58, 59, and orienting thereof according to the desired angular direction with respect to the optical sensing field 53 and scanning zone 54, which dual laser assembly 130 will be described below in more detail with reference to FIG. 10. It can be seen from FIG. 8 that the mounting device 80 as provided on enclosure body 72 has a lateral plate 86 designed for maintaining adjustment of a lens assembly 95 coupled to a camera 51 (or 51') not provided with a "Scheimpflug" adapter, as opposed to cameras 61, 61' provided on the second and third imaging sensor units 24, 24' referred to above, which camera 51 is mounted within the enclosure body 72 such that it has its optical sensing field 53 directed toward opening 76, with an enclosure front end wall 74 arranged so that a protecting optical element 78 extends in a plane perpendicular to the central direction of the optical sensing field 53. However, the lateral walls 113, 114 being designed according to a preset angle related to the angle at which the laser sources 58, 59 direct with respect to the optical sensing field 53 their respective linear-shaped laser beams 55, 67 toward the scanning zone 54, the enclosure front end wall 74 is secured at right angle to the base wall 84 without the need of wedges in the example shown.

As shown on FIG. 9, the enclosure assembly 70 is provided with a device 101 for displacing the enclosure body 72 in a direction (along axis X in reference system 39) perpendicular to the profile reference axis (axis Z in reference system 39) and parallel to the scanning plane (corresponding to the common plane of laser beams 55, 67 in the example shown) to adjust the position of the optical sensing field with respect to the scanning plane. As shown on FIG. 9 in view of FIG. 8, the base wall 84 is secured to an intermediate plate 99 provided on the enclosure assembly 70, a laterally protruding portion of which plate having a pair of flanged elements 100 as part of device 101, each of which receiving a bolt 102 adapted to engage a corresponding threaded bore provided on lateral wall 113, 114 of the mounting arrangement 105. Cooperating with guiding and securing bolts 107 engaging elongate apertures 127 provided on back mounting plate 112 forming a wide aperture 128 to lodge the device 101 as shown on FIG. 9, the device 101 allows fine adjustment of the position of enclosure body 72 along axis X in reference system 39 relative to the back mounting plate 112. It is to be understood that the adjustment device 101 may be provided on any other appropriate location with respect to the enclosure body, and that any other appropriate type of mechanical or electromechanical adjustment device can be used.

As shown on FIG. 8, the intermediate plate 99 provided on the enclosure assembly 70 has at rear end thereof a protruding portion having a flanged element 108 as part of a further device 110 mechanically coupled to the enclosure body 72 for displacing thereof in a direction transverse to axis X in reference system 39 to further adjust the position of the optical sensing field with respect to the scanning plane. For so doing, the flanged element 110 receives a bolt 109 adapted to engage a corresponding threaded bore provided on rear end wall 82. Cooperating with guiding and securing bolts 104 engaging elongate apertures (not shown) provided on base wall 84, the device 110 allows fine adjustment of position of the enclosure body 72 transversely to axis X in reference system 39 relative to the intermediate plate 99. It is to be understood that the adjustment device 110 may be provided on any other appropriate location with respect to the enclosure body, and that any other appropriate type of mechanical or electromechanical adjustment device can be used.

Turning now to FIG. 10, the dual laser assembly 130, will be now described in detail. As part of the dual laser securing device 122 is a back plate 132 adjustably mounted on the flanged element 120 using set screws 133 passing through elongate apertures 134 provided on back plate 132. The back plate is adapted to receive a dual laser mounting plate 136 through an intermediary cooling plate 138 made of a thermally conductive metal, as part of the cooling system 160 referred to above in view of FIG. 1, and whose function is to stabilize coherent light generation of the laser sources 58, 59 by allowing cooling and temperature control thereof. Set screws 139 are used to secure the mounting plate to the cooling plate 138, which is in turn secured to the back plate 132 using set screws 141. The cooling system further includes a cooling fluid flow circuit in fluid communication with inlet 142 and outlet 144 of collector 137 and integrated within a central portion of the back plate 132, and in thermal contact with the cooling plate 138, the latter being thermally insulated from the peripheral portion of the back plate using an adaptor 140 made of a proper thermal insulating material and secured to the back plate 132 using set screws 143. The body of collector 137 is hermetically affixed to upper portion of back plate 132 using screws 135, and is operatively connected to cooling fluid source as part of the cooling system though input and return lines (not shown) using couplings 145. The back plate 132 may be provided with sleeves 146 to gather the power supply and data lines connected to the laser sources 58, 59, and a connector 148 may be provided to receive output lines of temperature probes (not shown) enabling temperature control. According to an embodiment, in order to project their respective beams toward the same target scanning zone 54, in a substantially same direction and orientation within the common scanning plane, the first and second laser sources 58, 59 as part of dual laser assembly 130 can be adjacently disposed so that their linear-shaped beams 55, 67 as shown in FIG. 9 are aligned within the scanning plane and extend sufficiently to cover the entire target scanning zone 54, corresponding to the overlapping portions of laser beams 55 and 67 as designated at 73, while an extraneous portion 75 of laser beam 55 extends beyond the scanning zone 54 in the example shown, which extraneous portion 75 is not intersected by a board surface to be scanned. Turning back to FIG. 10, the proposed adjustment of direction and orientation of the laser sources 58, 59 can be obtained by making one of these laser sources stationary with respect to the mounting plate 136, while the other is made capable of being adjusted relative to the stationary laser source. In the example shown in FIG. 10, the second (green) laser source 59 is chosen to be stationary, while the first (red) laser source 58 allows adjustment through an appropriate support arrangement. For so doing, the casing 77 of laser source 59 is directly secured to the mounting plate 136 in a vertical position with its control connector 147 and power supply line 149 extending upwardly. In turn, the body portion of first laser source 58 is received within a channel provided on a support block 79, so that control line 129 and power supply line 131 of laser source 58 extend upwardly. The support block 79 is itself adapted to be received in a holder 83 secured to mounting plate 136 and providing position adjustment for the support block 79 through four screw and spring assemblies adapted to engage with corresponding holes 103 on support block 79. The dual laser assembly 130 may be contained for isolation from working environment in an enclosure 151 whose bottom wall 153 is provided with a pair of upper sockets 155 cooperating with lower sockets 157 to receive protective glasses 159 adapted to provide free transmission of the laser beams without distortion. A pair of pivoting shutters 165 may be provided, which can be brought in a beam closing position for safety purposes whenever operation of the scanning apparatus is interrupted to allow an intervention by the operator. In the case where a third laser source, e.g. blue laser, would be included in the imaging sensor unit, the mounting plate 136 could be designed to receive that additional laser source, and an additional protective glass and shutter could be mounted on the enclosure 151.

The invention claimed is:

1. A method of filtering noise of low frequency from an image of surface characteristics of an object expressed with reference to orthogonal first and second axis and obtained with linear light scanning of said object along said first axis, comprising the steps of:
   i) calculating a difference between pixel values of an image column vector along said second axis adjacent a selected reference image column vector and respective pixel values of said selected reference image column vector to obtain a pixel difference vector;
   ii) selecting the pixel difference values not mainly associated with a corresponding atypical change of surface characteristics as compared with noise;
   iii) calculating a mean value from said selected pixel difference values as an estimated value of said noise;
   iv) subtracting the estimated noise value from the adjacent image column vector to obtain a corrected image column vector;
   v) repeating said steps i) to iv) using the corrected image vector as said reference image column vector and a further adjacent image column vector to obtain further corrected image column vectors; and
   vi) generating a noise filtered image from the obtained corrected image column vectors.

2. The image noise filtering method according to claim 1, wherein said step v) further includes, at each repetition of said steps i) to iv), the steps of:
   a) calculating a cumulative mean value from said mean value calculated at said step iii); and
   b) as part of said difference calculating step i), subtracting the cumulative mean value from said pixel values of said adjacent image column vector and using subtraction resulting values to calculate said difference with the respective pixel values of said selected image column vector to obtain said pixel difference vector.

3. The image noise filtering method according to claim 1, wherein said selecting step ii) is performed by comparing each coordinate value of the pixel difference vector with a predetermined threshold.

4. The image noise filtering method according to claim 1, wherein said first and second axis are respectively designated by X and Y axis, the pixel values of said adjacent image column vector are for Y coordinates j=1 to h and X coordinate i=$i_r$+1 or i=$i_r$−1, the reference image column vector are for X coordinate i=$i_r$ and selected from X coordinates i=1 to w, the respective pixel values of said selected reference image column vector are for Y coordinates j=1 to h, said pixel difference vector is obtained for Y coordinates j=1 to h, and the further adjacent image column vector is for X coordinate i=$i_r$+1 or i=$i_r$−1 within i=1 to w.

5. A non-transitory software product data recording medium in which program code is stored causing a data processor means to perform method steps for filtering noise of low frequency from an image of the surface characteristics of an object expressed with reference to orthogonal first and second axis and obtained with linear light scanning of said object along said first axis, said method steps comprising:
   i) calculating a difference between pixel values of an image column vector along said second axis adjacent a selected reference image column vector and respective pixel values of said selected reference image column vector to obtain a pixel difference vector;
   ii) selecting the pixel difference values not mainly associated with a corresponding atypical change of surface characteristics as compared with noise;
   iii) calculating a mean value from said selected pixel difference values as an estimated value of said noise;
   iv) subtracting the estimated noise value from the adjacent image column vector to obtain a corrected image column vector;
   v) repeating said steps i) to iv) using the corrected image vector as said reference image column vector and a further adjacent image column vector to obtain further corrected image column vectors; and
   vi) generating a noise filtered image from the obtained corrected image column vectors.

6. The non-transitory software product data recording medium according to claim 5, wherein said step v) further includes, at each repetition of said steps i) to iv), the steps of:
   a) calculating a cumulative mean value from said mean value calculated at said step iii); and
   b) as part of said difference calculating step i), subtracting the cumulative mean value from said pixel values of said adjacent image column vector and using subtraction resulting values to calculate said difference with the respective pixel values of said selected image column vector to obtain said pixel difference vector.

7. The non-transitory software product data recording medium according to claim 5, wherein said selecting step ii) is performed by comparing each coordinate value of the pixel difference vector with a predetermined threshold.

8. The non-transitory software product data recording medium according to claim 5, wherein said first and second axis are respectively designated by X and Y axis, the pixel values of said adjacent image column vector are for Y coordinates j=1 to h and X coordinate i=$i_r$+1 or i=$i_r$−1, the reference image column vector are for X coordinate i=$i_r$ and selected from X coordinates i=1 to w, the respective pixel values of said selected reference image column vector are for Y coordinates j=1 to h, said pixel difference vector is obtained for Y coordinates j=1 to h, and the further adjacent image column vector is for X coordinate i=$i_r$+1 or i=$i_r$−1 within i=1 to w.

9. A method of filtering noise of low frequency from an image representing surface characteristics of an object scanned along a travel path axis using an imaging sensor having a sensing field defining a scanning zone, said image being expressed with reference to orthogonal first and second axis and obtained with linear light scanning of said object along said first axis, the method comprising the steps of:
   i) directing the sensing field transversely toward said travel path axis;
   ii) directing a linear-shaped light beam toward said scanning zone to form a reflected line onto said object surface;
   iii) causing said imaging sensor to capture said reflected line and to produce said image representing the surface characteristics of said object;

iv) calculating a difference between pixel values of an image column vector along said second axis adjacent a selected reference image column vector and respective pixel values of said selected reference image column vector to obtain a pixel difference vector;

v) selecting the pixel difference values not mainly associated with a corresponding atypical change of surface characteristics as compared with noise;

vi) calculating a mean value from said selected pixel difference values as an estimated value of said noise;

vii) subtracting the estimated noise value from the adjacent image column vector to obtain a corrected image column vector;

viii) repeating said steps iv) to vii) using the corrected image vector as said reference image column vector and a further adjacent image column vector to obtain further corrected image column vectors; and ix) generating a noise filtered image from the obtained corrected image column vectors.

10. The image noise filtering method according to claim 9, wherein said step viii) further includes, at each repetition of said steps iv) to vii), the steps of:
a) calculating a cumulative mean value from said mean value calculated at said step iii); and
b) as part of said difference calculating step iv), subtracting the cumulative mean value from said pixel values of said adjacent image column vector and using subtraction resulting values to calculate said difference with the respective pixel values of said selected image column vector to obtain said pixel difference vector.

11. The image noise filtering method according to claim 9, wherein said selecting step v) is performed by comparing each coordinate value of the pixel difference vector with a predetermined threshold.

12. The image noise filtering method according to claim 9, wherein said first and second axis are respectively designated by X and Y axis, the pixel values of said adjacent image column vector are for Y coordinates j=1 to h and X coordinate $i=i_r+1$ or $i=i_r-1$, the reference image column vector are for X coordinate $i=i_r$ and selected from X coordinates i=1 to w, the respective pixel values of said selected reference image column vector are for Y coordinates j=1 to h, said pixel difference vector is obtained for Y coordinates j=1 to h, and the further adjacent image column vector is for X coordinate $i=i_r+1$ or $i=i_r-1$ within i=1 to w.

13. An apparatus for generating a low frequency noise filtered image representing surface characteristics of an object scanned along a travel path axis, said image being expressed with reference to orthogonal first and second axis and obtained with linear light scanning along said first axis, said apparatus comprising:
an imaging sensor unit having a sensing field transversely directed toward said travel path axis and defining a scanning zone, said imaging sensor unit including:
a light source configured for directing a linear-shaped light beam toward said scanning zone to form a reflected line onto said article surface; and
a digital camera defining said sensing field and configured to capture said reflected line and to produce said image representing the surface characteristics of said object; and
data processor means programmed for:
calculating the difference between pixel values of an image column vector along said second axis adjacent a selected reference image column vector and respective pixel values of said selected reference image column vector to obtain a pixel difference vector;
selecting the pixel difference values not mainly associated with a corresponding atypical change of surface characteristics as compared with noise;
calculating a mean value from said selected pixel difference values as an estimated value of said noise;
subtracting the estimated noise value from the adjacent image column vector to obtain a corrected image column vector;
repeating said pixel difference values calculating, said pixel difference values selecting, said mean value calculating and said estimated noise value subtracting, using the corrected image vector as said reference image column vector and a further adjacent image column vector to obtain further corrected image column vectors; and
generating a noise filtered image from the obtained corrected image column vectors.

14. The apparatus according to claim 13, wherein said data processor means is further programmed, at each said repeating, for:
calculating a cumulative mean value from said calculated mean value; and
as part of said difference values calculating, subtracting the cumulative mean value from said pixel values of said adjacent image column vector and using subtraction resulting values to calculate said difference with the respective pixel values of said selected image column vector to obtain said pixel difference vector.

15. The apparatus according to claim 13, wherein said data processor means is programmed to performed said pixel difference values selection by comparing each coordinate value of the pixel difference vector with a predetermined threshold.

16. The apparatus according to claim 13, wherein said first and second axis are respectively designated by X and Y axis, said data processor means is programmed so that the pixel values of said adjacent image column vector are for Y coordinates j=1 to h and X coordinate $i=i_r+1$ or $i=i_r-1$, the reference image column vector are for X coordinate $i=i_r$ and selected from X coordinates i=1 to w, the respective pixel values of said selected reference image column vector are for Y coordinates j=1 to h, said pixel difference vector is obtained for Y coordinates j=1 to h, and the further adjacent image column vector is for X coordinate $i=i_r+1$ or $i=i_r-1$ within i=1 to w.

* * * * *